(12) United States Patent
Fujishima

(10) Patent No.: US 12,523,864 B2
(45) Date of Patent: Jan. 13, 2026

(54) MOVABLE DEVICE, RANGE-FINDING APPARATUS, IMAGE DISPLAY APPARATUS, HEAD-MOUNTED DISPLAY, WAVELENGTH-VARIABLE LASER UNIT, AND SPECTROSCOPIC SENSOR

(71) Applicant: Masayuki Fujishima, Kanagawa (JP)

(72) Inventor: Masayuki Fujishima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 302 days.

(21) Appl. No.: 18/123,363

(22) Filed: Mar. 20, 2023

(65) Prior Publication Data
US 2023/0305292 A1 Sep. 28, 2023

(30) Foreign Application Priority Data

Mar. 22, 2022 (JP) .................................. 2022-046075
Nov. 29, 2022 (JP) .................................. 2022-190844

(51) Int. Cl.
| | | |
|---|---|---|
| *G02B 26/08* | (2006.01) | |
| *G01S 7/481* | (2006.01) | |
| *G02B 26/10* | (2006.01) | |
| *G01J 3/06* | (2006.01) | |
| *G02B 27/01* | (2006.01) | |

(52) U.S. Cl.
CPC ........ *G02B 26/0858* (2013.01); *G01S 7/4817* (2013.01); *G02B 26/10* (2013.01); *G01J 3/06* (2013.01); *G01J 2003/064* (2013.01); *G02B 27/0172* (2013.01); *G02B 2027/0178* (2013.01)

(58) Field of Classification Search
CPC .. G02B 26/001; G02B 26/007; G02B 26/008; G02B 26/0816–0866; G01J 3/06; G01S 7/4817
See application file for complete search history.

(56) References Cited

U.S. PATENT DOCUMENTS 5,739,945 A * 4/1998 Tayebati ............ G02B 26/0841
356/519
5,959,376 A * 9/1999 Allen ..................... H02N 1/006
310/40 MM (Continued)

FOREIGN PATENT DOCUMENTS

| JP | 2008-040240 | 2/2008 | |
|---|---|---|---|
| JP | 2022-188597 | 12/2022 | |
| WO | WO-2015182710 A1 * | 12/2015 | ........... G01S 7/4817 |

OTHER PUBLICATIONS

English machine translation of WO-2015182710 (Year: 2015).*

*Primary Examiner* — Nicholas R. Pasko
(74) *Attorney, Agent, or Firm* — XSENSUS LLP

(57) ABSTRACT

A movable device includes: a movable portion; a driving section configured to generate a driving force to move the movable portion; a movement mechanical section; and at least one convex portion. The movement mechanical section includes: a contact portion contacting the movable portion, the contact portion movable in a movement direction by the driving force of the driving section; and multiple concave-convex portions movable with the contact portion in the movement direction. At least one convex portion engaging with corresponding one of the multiple concave-convex portions, said at least one convex portion being static relative to the movement mechanical section in the movement direction.

10 Claims, 16 Drawing Sheets

(56) References Cited

U.S. PATENT DOCUMENTS

| | | | |
|---|---|---|---|
| 8,087,792 B2* | 1/2012 | Eigler | G02B 26/0816 |
| | | | 359/861 |
| 8,854,281 B2* | 10/2014 | Ho | G02B 27/0101 |
| | | | 359/292 |
| 9,541,647 B2* | 1/2017 | Yan | G01S 17/88 |
| 10,180,557 B2* | 1/2019 | Shihoh | G02B 27/646 |
| 2004/0022479 A1* | 2/2004 | Hamerly | G02B 26/0841 |
| | | | 359/872 |
| 2007/0089309 A1* | 4/2007 | Kodaira | G01C 15/002 |
| | | | 33/290 |
| 2011/0085153 A1* | 4/2011 | Rung | G01S 7/4817 |
| | | | 356/4.01 |
| 2018/0215608 A1 | 8/2018 | Fujishima et al. | |
| 2022/0397677 A1* | 12/2022 | Fujishima | G02B 26/0858 |

* cited by examiner

FIG. 6A
DRIVING DIRECTION OF MECHANICAL SECTION
←→

150 CONVEX PORTION

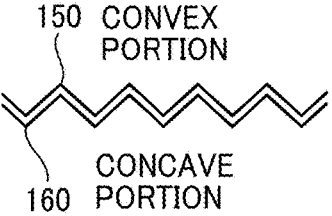

160 CONCAVE PORTION

FIG. 6B
DRIVING DIRECTION OF MECHANICAL SECTION
←→

CONVEX PORTION

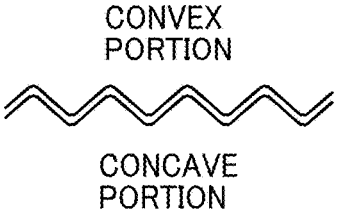

CONCAVE PORTION

FIG. 6C
DRIVING DIRECTION OF MECHANICAL SECTION
←→

CONVEX PORTION

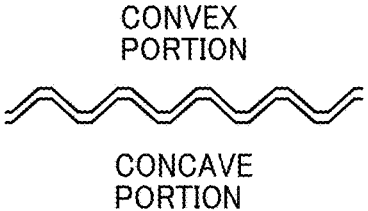

CONCAVE PORTION

FIG. 7A
DRIVING DIRECTION OF MECHANICAL SECTION
←

150 CONVEX PORTION

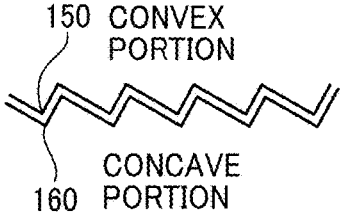

160 CONCAVE PORTION

FIG. 7B
DRIVING DIRECTION OF MECHANICAL SECTION
←

CONVEX PORTION

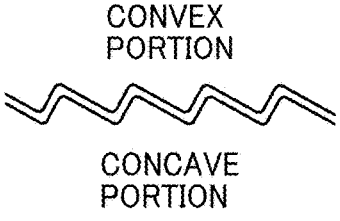

CONCAVE PORTION

FIG. 7C
DRIVING DIRECTION OF MECHANICAL SECTION
←

CONVEX PORTION

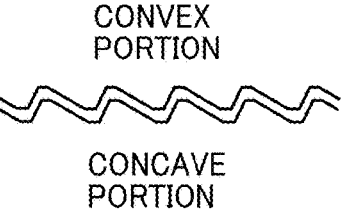

CONCAVE PORTION

FIG. 8A
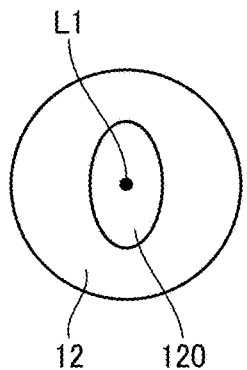

L1

12   120

FIG. 8B
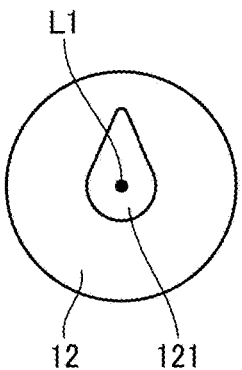

L1

12   121

FIG. 8C
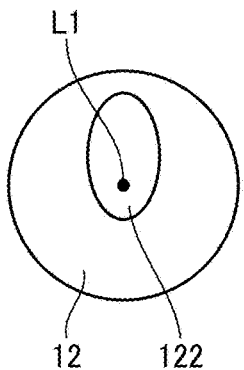

L1

12   122

FIG. 8D
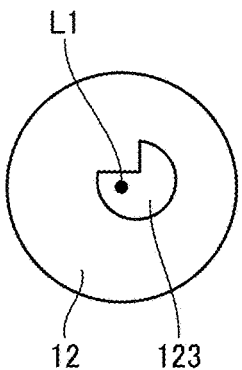

L1

12   123

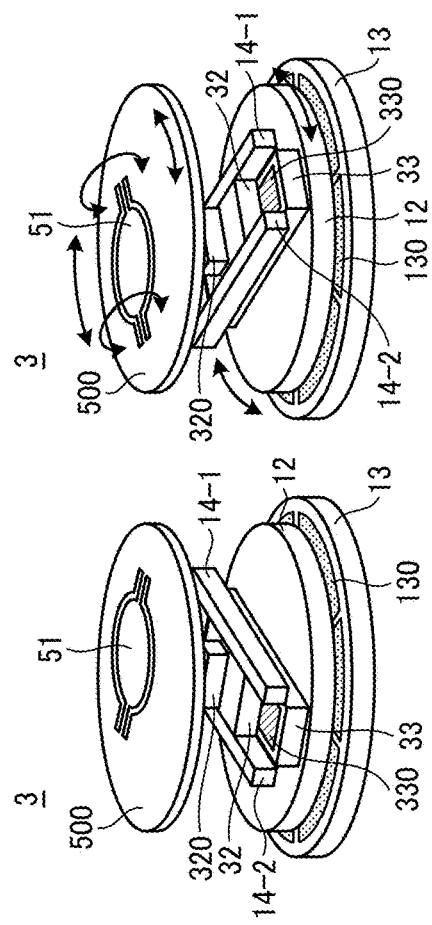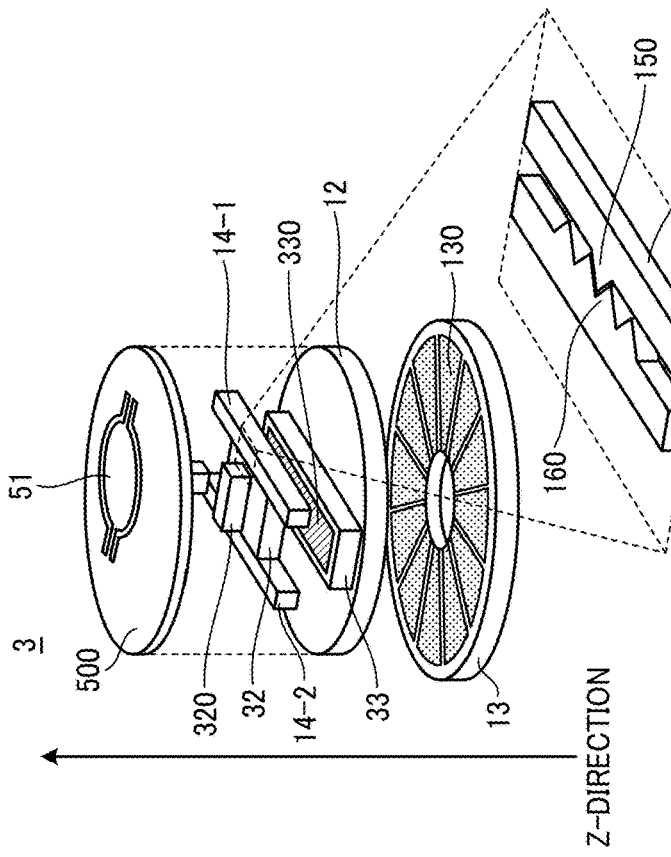

MOVABLE DEVICE, RANGE-FINDING APPARATUS, IMAGE DISPLAY APPARATUS, HEAD-MOUNTED DISPLAY, WAVELENGTH-VARIABLE LASER UNIT, AND SPECTROSCOPIC SENSOR

CROSS-REFERENCE TO RELATED APPLICATIONS

This patent application is based on and claims priority pursuant to 35 U.S.C. § 119(a) to Japanese Patent Application No. 2022-046075, filed on Mar. 22, 2022 and Japanese Patent Application No. 2022-190844, filed on Nov. 29, 2022, in the Japan Patent Office, the entire disclosure of which is hereby incorporated by reference herein.

BACKGROUND

Technical Field

The present disclosure relates to a movable device, a range-finding apparatus, an image display apparatus, a head-mounted display, a wavelength-variable laser unit, and a spectroscopic sensor.

Related Art

The development of a micro-electromechanical systems (MEMS) device that is manufactured by performing micro-machining or fine patterning for silicon or glass is in progress.

SUMMARY

An embodiment of the present disclosure provides a movable device includes: a movable portion; a driving section configured to generate a driving force to move the movable portion, a movement mechanical section; and at least one convex portion. The movement mechanical section includes: a contact portion contacting the movable portion, the contact portion movable in a movement direction by the driving force of the driving section; and multiple concave-convex portions movable with the contact portion in the movement direction. At least one convex portion engaging with corresponding one of the multiple concave-convex portions, said at least one convex portion being static relative to the movement mechanical section in the movement direction.

Another embodiment of the present disclosure provides a movable device includes: a movable portion; a driving section configured to generate a driving force to move the movable portion; a movement mechanical section; and at least one concave portion. The movement mechanical section includes: a contact portion contacting the movable portion, the contact portion movable in a movement direction by the driving force of the driving section; and multiple concave-convex portions movable with the contact portion. At least one concave portion engages with corresponding one of the multiple concave-convex portions, said at least one convex portion being static relative to the movement mechanical section in the movement direction.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 6A, 6B, and 6C are illustrations of concave portions and convex portions according to a second modification of the first embodiment;

FIGS. 7A, 7B, and 7C are other illustrations of concave portions and convex portions according to the second modification;

FIGS. 8A, 8B, 8C, and 8D are illustrations of a contact portion according to a third modification of the first embodiment;

FIGS. 14A, 14B, and 14C are perspective views of a configuration of a movable device according to a fifth embodiment;

Figure 1:
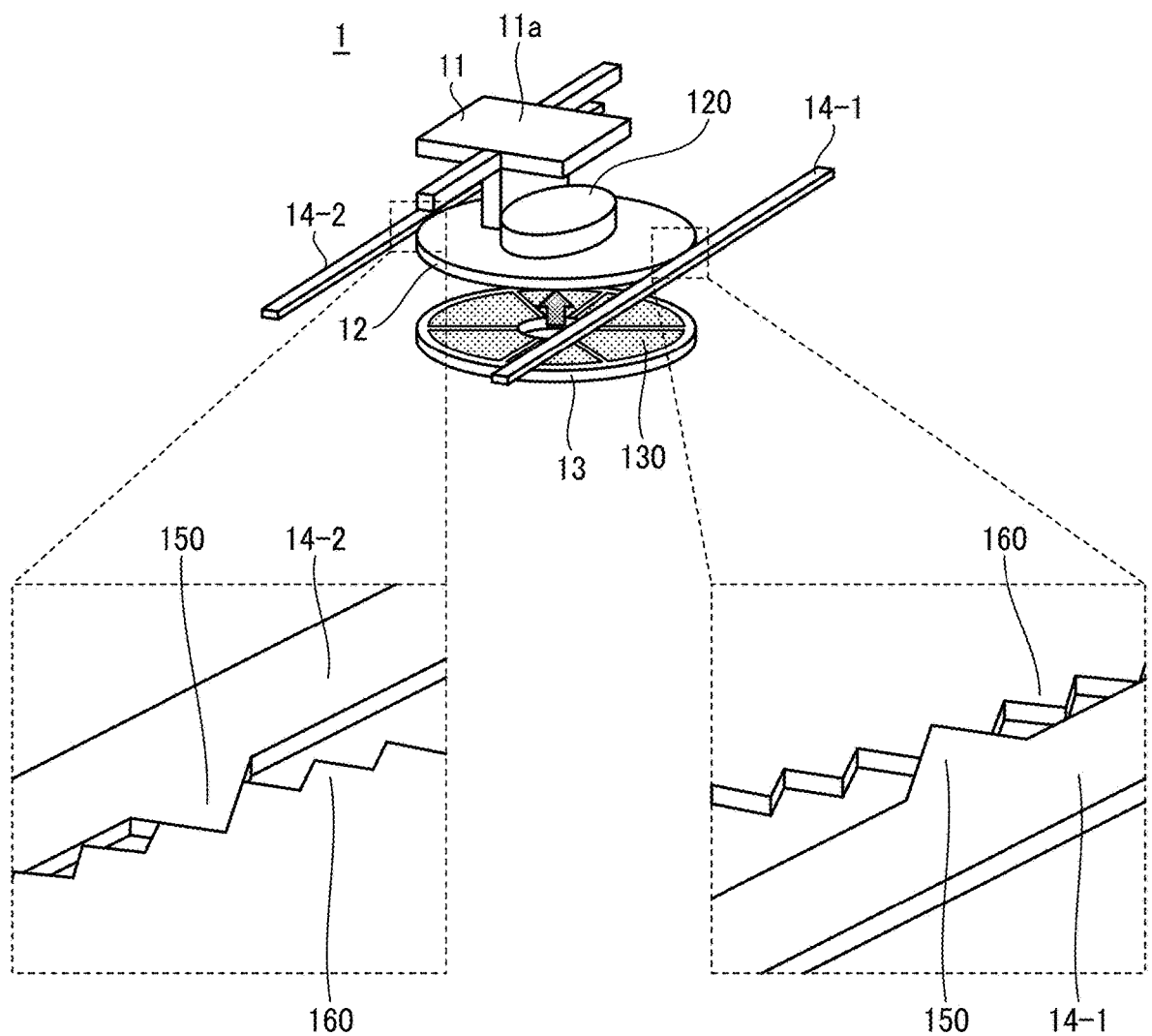
FIG. 1 is a perspective view of a configuration of a movable device according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure prevent or reduce the supply of voltage or current when the movable portion is kept stationary.

Hereinafter, embodiments of a movable device, a range-finding apparatus, an image display apparatus, a head-mounted display, a wavelength-variable laser unit, and a spectroscopic sensor will be described in detail with reference to the accompanying drawings.

In the following description, the "mechanical section" is synonymous with the "movement mechanical section". "Driving section" is synonymous with "driving force generating unit". In the drawings, the same components are denoted by the same reference number, and redundant description thereof will be appropriately omitted.

First Embodiment

In the present embodiment, a movable device is a micro electromagnetic susceptibility (MEMS) that is manufactured by semiconductor processing. This is only one example. The movable device 1 is manufactured by etching a silicon on insulator (SOI) substrate or the like. Note that the movable device is not limited to this configuration. Alternatively, the movable device may be a device other than the MEMS device, or may be manufactured by a manufacturing method other than the semiconductor processing.

Configuration of Movable Device

FIG. 1 is a perspective view of a configuration of a movable device according to a first embodiment. The movable device 1 includes a movable portion 11, a mechanical section 12, and a driving section 13. The driving section 13 is at a position to be in contact with the mechanical section 12, which is indicated by arrow in FIG. 1. Specifically, the driving section 13 is located at a position opposite to the movable portion 11 across the mechanical section 12 and is in contact with the mechanical section 12. For ease of description, the driving section 13 is illustrated at a position where the configuration thereof can be seen.

The movable portion 11 has a reflecting portion 11a and a movable starting point. The movable portion 11 is supported by a beam so as to oscillate to change the direction of the reflecting portion 11a.

The mechanical section 12 includes a contact portion 120 that comes into contact with the movable portion 11. The mechanical section 12 moves with the force of the driving section 13 and drives the movable portion 11 in a direction in which the movable portion 11 is oscillatable, via the contact portion 120. In other words, the movable portion 11 moves together with the movement of the mechanical section 12.

The mechanical section 12 in FIG. 1 is a movement mechanical section that performs a rotational motion or a turning motion. The rotational motion is a motion of one or more rotations in the rotation direction, and the turning motion is a motion of less than one rotation. Both the rotational motion and the turning motion are reciprocating motions which include a motion in one direction and a motion in the opposite direction, but the rotational motion may be a motion in one direction. In the following description, when the movement direction is indicated, it is referred to as the rotation direction even when the turning motion is performed.

In FIG. 1, the rotation axis of the mechanical section 12 and the central axis of the contact portion 120 substantially coincide with each other. With the driving force of the driving section 13 in the rotation direction, the mechanical section 12 drives in the rotation direction integrally with the contact portion 120 (i.e., the contact portion also drives in the rotation direction with the movement of the mechanical section 12).

The driving section 13 generates a driving force to drive the mechanical section 12 in the rotation direction. The driving section 13 is fixed against rotation. Specifically, the driving section 13 is fixed by being connected to a support member and multiple beams on a plane perpendicular to the rotation axis of the driving section 13, the support member and the beams surrounding the driving section 13. The driving section 13 comes into contact with the mechanical section 12 in a pressurized state, and when an electric signal (driving signal) is input to the driving section 13, the driving section 13 gives a driving force in a rotation direction to the mechanical section 12. In this case, for example, one or both of the mechanical section 12 and the contact portion 120 are made of metal. Further, a magnet is placed opposite to the mechanical section 12 across the driving section 13 to create a pressurized state with magnetic force. When the driving force applied to the mechanical section 12 by the driving section 13 exceeds a certain force, the mechanical section 12 receives the driving force of the driving section 13 and is driven in the rotation direction.

Driving the mechanical section 12 in the rotating direction pushes the movable portion 11 via the contact portion 120 and thus tilts the movable portion 11. When the movable portion 11 is brought to a standstill while being tilted, the contact portion 120 receives a force (corresponding to a restoring force) by which the movable portion 11 returns to the original horizontal state. With this force, the mechanical section 12 is forced to move in the same direction as the rotation direction of the mechanical section 12 or in the opposite direction. To deal with such a force on the mechanical section 12, the movable device 1 is provided with an engaging mechanism for reducing or preventing the movement of the mechanical section 12 in response to the restoring force of the movable portion 11. That is, the engaging mechanism reduces or prevents the movement of the mechanical section 12 and thus prevents a change in the tilt of the reflecting portion 11a of the movable portion 11.

FIG. 1 is an enlarged view of a part of the movable device 1, illustrating a convex portion 150 and concave portions 160 of the engaging mechanism.

The mechanical section 12 has multiple concave portions 160 (i.e., multiple concave-convex portions) in the rotation direction at the edge portion of the mechanical section 12. The multiple concave portions 160 include a peak portion of the convex shape and a recess which is a valley portion between the convex shapes. In addition, support portions 14-1 and 14-2 each have a convex portion 150 at a position facing the concave portion 160. The convex portion 150 is provided at a stationary position relative to the movement direction of the mechanical section 12. In the present disclosure, the movement direction in which the mechanical section 12 rotates refers to a movement direction of the mechanical section 12 in an area where the convex portion and the concave portion engage with each other. In other words, the movement direction is a direction parallel to a straight line orthogonal to a straight line passing through a rotation axis L1 (see FIGS. 3A, 3B, and 3C) and the convex portion 150 in an XY plane, which is a plane indicated in FIGS. 3A, 3B, and 3C.

Although the following describes the convex portion 150 provided on each of the support portion 14-1 and the support portion 14-2, the convex portion 150 may be provided in any one of the support portion 14-1 and the support portion 14-2. Such a configuration also exhibits the same advantageous effects. Similarly, in each embodiment and each modified example described below, the convex portion 150 may be provided in any one of the support portion 14-1 and the support portion 14-2.

In addition, in the present embodiment, one convex portion 150 is provided in each of the support portion 14-1 and the support portion 14-2. However, in some embodiments, multiple convex portions 150 may be provided in each of the support portion 14-1 and the support portion 14-2.

Further, instead of the convex portion 150, a concave portion may be provided in one or both of the support portion 14-1 and the support portion 14-2. In such a configuration including a concave portion instead of the convex portion 150, the mechanical section 12 includes multiple convex portions positioned to face the concave portion, instead of including the concave portions 160. Further, in such a configuration including a concave portion instead of the convex portion 150, the number of concave portions provided in the support portion 14-1 or the support portion 14-2 may be one or more. Similarly, in each of the embodiments and modifications described below, a concave portion may be provided, instead of the convex portion 150, in one or both of the support portion 14-1 and the support portion 14-2.

In any configuration, one or more concave portions and one or more convex portions are configured to hold the mechanical section 12 and the movable portion 11 while preventing the displacement between the mechanical section 12 and the movable portion 11 using an engagement force between the concave portion and the convex portion, which is described later.

Each convex portion 150 has a peak portion of the convex shape. In a configuration including multiple convex portions 150, a valley portion exists between the convex portions. The convex portion 150 engages with a corresponding concave portion 160 of multiple concave portions 160 (i.e., a concave portion 160 at a position corresponding to the convex portion 150).

The support portion 14-1 and the support portion 14-2 are pressed by a spring structure so that the convex portion 150 engages with the concave portion 160 of the mechanical section 12 under a predetermined force. Driving the mechanical section 12 in the rotation direction moves the support portion 14-1 and the support portion 14-2 outward when the convex portion 150 moves out of the recess of the concave portion 160 being engaged with the convex portion 150. This engaging mechanism prevents the concave portion 160 from passing by the peak portion of the convex portion 150 in response to the movement of the mechanical section 12 in the rotation direction under restoring force that acts to return the movable portion 11 to the original horizontal state. Thus, the driving force applied to the mechanical section 12 by the driving section 13 is reduced to a certain degree or less.

In addition, the support portion 14-1 and the support portion 14-2 hold the mechanical section 12 and the movable portion 11 so as not to be displaced by the engagement force between the convex portion 150 and the concave portion 160 engaged with each other irrespective of when voltage or current applied to the driving section 13 becomes a predetermined value or lower.

The engagement force between the convex portion 150 and the concave portion 160 engaged with each other is preferably greater than the restoring force of the movable portion 11, which is received by the mechanical section 12 via the contact portion 120. The configuration described enables a minimum degree of voltage or current applied to the driving section 13 when the reflecting portion 11a of the movable portion 11 is kept stationary in a desired direction.

Method for Driving Movable Device

The driving section 13 in FIG. 1 includes piezoelectric elements 130 on a surface facing the mechanical section 12.

The piezoelectric elements 130 are provided around the rotation axis of the mechanical section 12 to contract along the rotation direction. In this example (FIG. 1), six piezoelectric elements 130 having the same shape are provided along the rotation direction. The mechanical section 12 is driven by sequentially inputting electric signals to the piezoelectric elements 130 with changes in driving phase in the rotating direction. The number of piezoelectric elements 130 is not limited to six as illustrated in FIG. 1. The number of piezoelectric elements 130 is preferably a multiple of 4, such as 8 or 12.

FIGS. 2A, 2B, 2C, and 2D are illustrations of a method for driving the driving section 13 according to an embodiment of the present disclosure. FIGS. 2A, 2B, 2C, and 2D are cross-sectional views of the driving section 13 and the mechanical section 12, which are for describing changes in one cycle.

In each of FIGS. 2A, 2B, 2C, and 2D, the piezoelectric elements 130 are not illustrated because they are thin. The driving section 13 includes the piezoelectric element 130 on a surface facing the mechanical section 12. Note that one cycle is a cycle in which one point P of the driving section 13 performs the elliptical motion q once. In this cycle, the position of the point P of the driving section 13 repeatedly changes during the driving period. Although the input electric signal is described as driving the mechanical section 12 in the forward rotation direction (clockwise), it is also possible to drive the mechanical section 12 in the reverse rotation direction (counterclockwise).

Figure 2A:
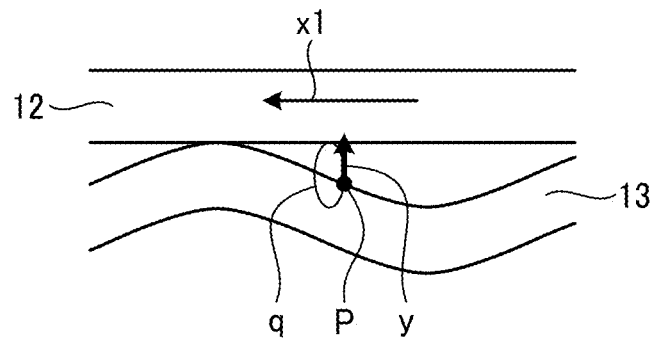
FIGS. 2A, 2B, 2C, and 2D are illustrations of a method for driving a driving section of the movable device in FIG. 1, according to an embodiment of the present disclosure.
Figure 2B:
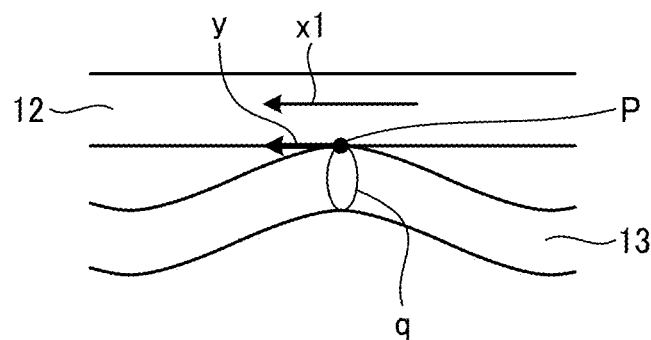
Figure 2C:
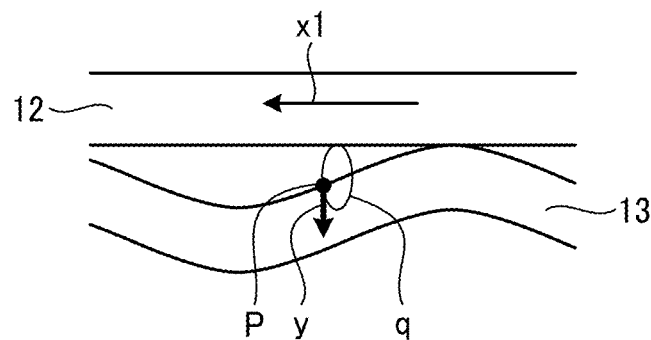
Figure 2D:
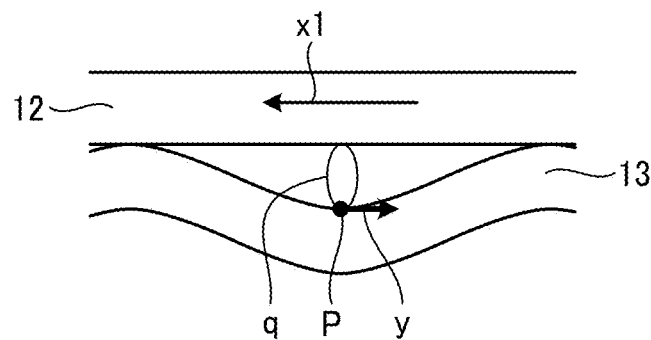

In response to inputting an electric signal to the driving section 13, a vibration wave is generated in the driving section 13, and the point P at any position on the surface of the driving section 13 starts an elliptical motion q. This drives the mechanical section 12 contacting the driving section 13. In other words, the point P at any position on the surface of the driving section 13 travels in an elliptical motion q in the cycles of FIGS. 2A, 2B, 2C, and 2D. At the point P, a force acts in the direction of arrow y during the elliptical motion q. In FIG. 2A, a force acts in a direction of pushing the mechanical section 12. In FIG. 2B, a force acts to feed the mechanical section 12 in a direction of arrow x1. As a result, the mechanical section 12 receives such a force in the direction of arrow x1 and is driven. The arrow x1 indicates a forward rotation direction of the mechanical section 12. The mechanical section 12 is driven by receiving a force in the forward rotation direction from a position where each piezoelectric element 130 is provided.

Figure 3A:
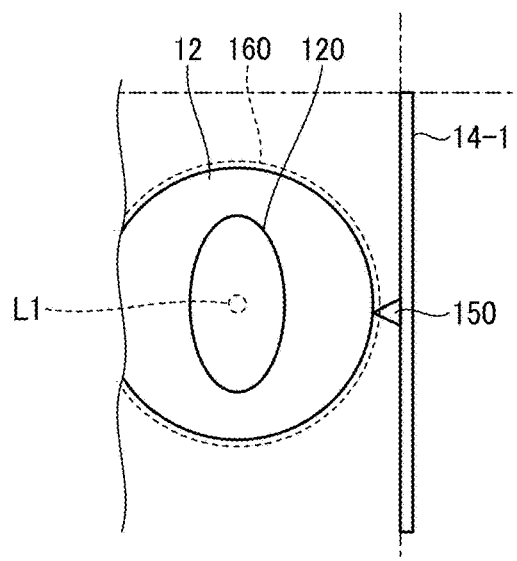
FIGS. 3A, 3B, and 3C are diagrams of the relation between concave portions of a mechanical section and a convex portion of a support portion during the driving of the mechanical section in the movable device in FIG. 1.
Figure 3B:
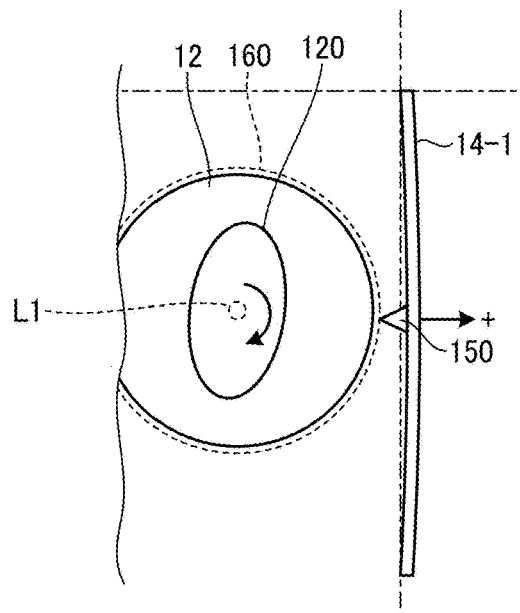
Figure 3C:
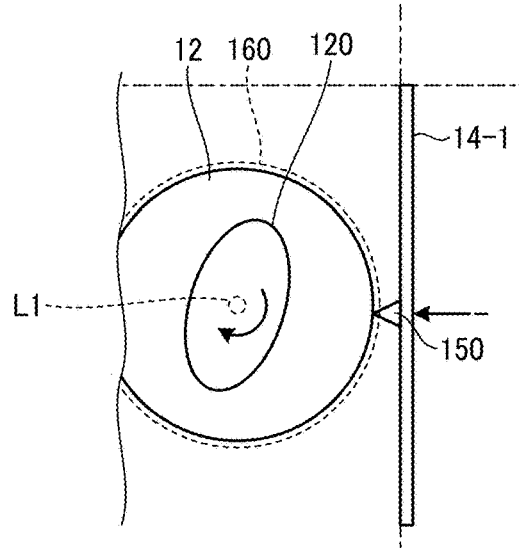

FIGS. 3A, 3B, and 3C are diagrams of the relation between the concave portions 160 of the mechanical section 12 and the convex portion 150 of the support portion 14-1 during the driving of the mechanical section 12. FIGS. 3A to 3C are plan views of the mechanical section 12 and the support portion 14-1 during the driving of the mechanical section 12. The support portion 14-2 is disposed symmetrically with the support portion 14-1 in the vertical direction and is driven together in a direction opposite to the driving direction of the support portion 14-1 in plan view of the mechanical section 12 as illustrated in FIGS. 3A, 3B, and 3C.

As illustrated in FIG. 3A, multiple concave portions 160 are disposed on the outer circumferential surface (i.e., the edge portion) of the mechanical section 12. The concave portions 160 are disposed over the entire circumference of the outer circumferential surface when the mechanical section 12 is intended to perform a rotational motion of one rotation as illustrated in FIGS. 3A, 3B, and 3C. In the mechanical section 12 that is not intended to perform a rotational motion, the concave portions 160 may be provided in a driving area (rotation area) in which the mechanical section 12 is driven to rotate.

Although only one convex portion 150 is provided on the support portion 14-1, the number of convex portions is not limited to one as described above and may be plural. When the number of engagement portions at each of which the concave portion 160 is engaged with the convex portion 150 is increased, multiple convex portions 150 may be provided in corresponding engagement area. In addition, the support portion 14-1 is illustrated as having a linear shape, but is not limited thereto. The support portion 14-1 may have a curved shape along the outer circumferential surface of the mechanical section 12. The support portion 14-1 may be a rod, a wall, or a structure having another shape as long as it has a shape that can be provided with the convex portion 150.

FIG. 3A is an illustration of the convex portion 150 engaged with the concave portion 160 of the concave portions 160. From the state in FIG. 3A, the mechanical section 12 is driven to rotate in the rotation direction. The driving force of the driving section 13 is used to cause the concave portion 160 to move beyond the convex portion 150. The "engagement" between the convex portion 150 and the concave portion 160 means a state in which the convex portion 150 and the concave portion 160 are in contact with each other at a surface or a point so as to inhibit the movement of the mechanical section 120 in the movement direction. The phrase "engaged with or fit into" means a state that satisfies such a state.

As illustrated in FIG. 3B, with the mechanical section 12 driven in the rotation direction, the convex portion 150 is pressed by the peak portion of the concave portion 160 so that the central portion of the support portion 14-1 is elastically deformed and pushed out in the direction of an arrow + with the ends of the support portion 14-1 fixed. Thus, the convex portion 150 passes by the peak portion of the concave portion 16. For the support portion 14-2 symmetrical to the support portion 14-1 in the horizontal direction, the central portion of the support portion 14-2 is elastically deformed and pushed out in the opposite direction (−) of the arrow + with the ends of the support portion 14-2 fixed.

In FIG. 3C, with the mechanical section 12 further driven to rotate about the rotation axis L1, the support portion 14-1 is pushed back by the spring mechanism and gradually returns in the direction of an arrow − after the convex portion 150 passes by the peak portion of the concave portion 160. Then, the convex portion 150 engages with the recess of another concave portion 160 adjacent to the concave portion 160 out of which the convex portion 150 has moved out.

The support portion 14-2 gradually returns in the direction of the arrow + and engages with the valley portion of another concave portion 160 adjacent to the concave portion 160 out of which the convex portion 150 has moved out.

During the movement of the mechanical section 12, a cycle of the states illustrated in FIGS. 3A to 3C are repeated, and the convex portion 150 passes by the peak of the concave portion 160 one after another while changing the position of engagement between the concave portion 160 and the convex portion 150 (or a corresponding concave portion to engage with the convex portion 150 changes from one to another). With such a repeated action, the mechanical section 12 is driven to rotate in the rotation direction.

In FIGS. 3A, 3B, and 3C, the contact portion 120 that rotates integrally with the mechanical section 12 about the same axis, i.e., the rotational axis L1. The contour of the contact portion 120 has an elliptical shape as an example. The direction of the contact portion 120 changes with the driving of the mechanical section 12. The contact portion (in this example, the contact point) between the contact portion 120 and the movable portion 11 changes along the contour of the contact portion 120. In this configuration, the direction of the movable portion 11 is changed in a desired direction, i.e., the direction of the reflecting portion 11a is changed in a desired direction by determining which location to stop the contact point on the contour of the contact portion 120.

When the direction of the reflecting portion 11a is desired to be fixed, the engaging mechanism allows the mechanical section 12 to remain stationary using a first force greater than a second force pushing back the contact portion 120 under the restoring force that acts to return the movable portion 11 to the original horizontal state. In other words, the concave portion 160 fails to move beyond the peak portion of the convex portion 150 irrespective of the rotation of the mechanical section 12 in the rotation direction. In this configuration, the mechanical section 12 can remain stationary irrespective of a reduction in the driving force for driving the mechanical section 12 by the driving section 13. For example, an electric signal is input to the driving section 13 to drive the mechanical section 12 in the rotation direction, and the input of the electric signal to the driving section 13 is cut off to stop the driving of the mechanical section 12 in the rotation direction and keep the mechanical section 12 at a standstill.

Figure 4A:
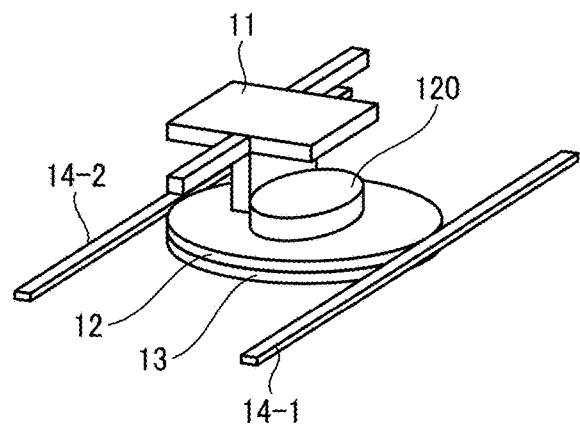
FIGS. 4A and 4B are illustrations of the stationary state of a movable portion of the movable device in FIG. 1, according to an embodiment of the present disclosure.
Figure 4B:
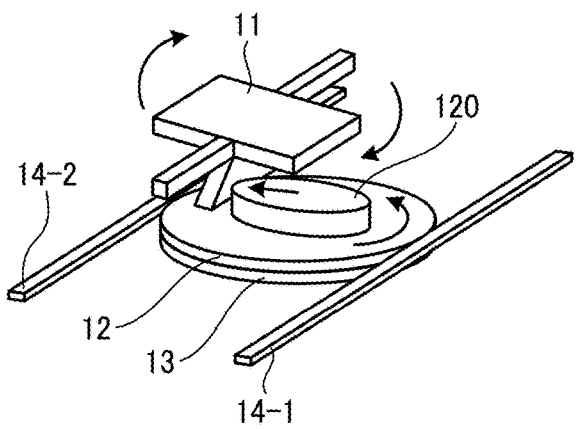

FIGS. 4A and 4B are illustrations of a stationary state of the movable portion 11. With an electrical signal continuously input to the driving section 13, the movable portion 11 changes its orientation from a first state FIG. 4A to a second state in FIG. 4B. The movable portion 11 remains stationary as in FIG. 4B after the input of the electrical signal is stopped.

FIG. 4A is an illustration of the orientation of the movable portion 11 having its force balanced with the force of the contact portion 120 with no electrical signal input to the driving section 13. In response to driving the mechanical section 12 after an electrical signal is input to the driving section 13, the mechanical section 12 and the contact portion 120 rotate together in the rotation direction so that the direction of the contact portion is changed as illustrated in FIG. 4B. Then, the contact location at which the contact portion 120 contacts the movable starting point of the movable portion 11 varies, and the movable starting point is pushed by the contact portion 120 to tilt the movable portion 11 as a whole around a fixed axis.

In the state illustrated in FIG. 4B, the engaging mechanism operates to bring the movable portion 11 to a standstill with the orientation FIG. 4B irrespective of cut-off input electrical signal.

In such a configuration described above, in response to cut-off input electrical signal, the mechanical section 12 receives a force to return under the restoring force that acts to bring the movable portion back to the original orientation. The present embodiment provides the engaging mechanism that prevents a convex portion engaged with a first concave portion from moving to a second concave portion adjacent to the first concave portion in the mechanical section, and thus allows the mechanical section to come to a standstill at its position and also enables the movable portion to remain stationary at a desired tilt angle.

In the present embodiment, the driving section 13 includes multiple piezoelectric elements 130 along the rotation direction of the mechanical section 12. The driving direction: a forward direction or a reverse direction in which the mechanical section 12 is driven to rotate is selected in accordance with the electric signal input to the piezoelectric elements 130 of the driving section 13.

In the present embodiment, the driving section and the mechanical section are stacked. This structure enables a reduction in the area of the movable device as a whole and allows a smaller size of the device.

First Modification of First Embodiment

The mechanical section can be driven by multiple drivers. In the first embodiment, piezoelectric elements are provided as the multiple drivers. Alternatively, drivers other than piezoelectric elements may be used.

Figure 5:
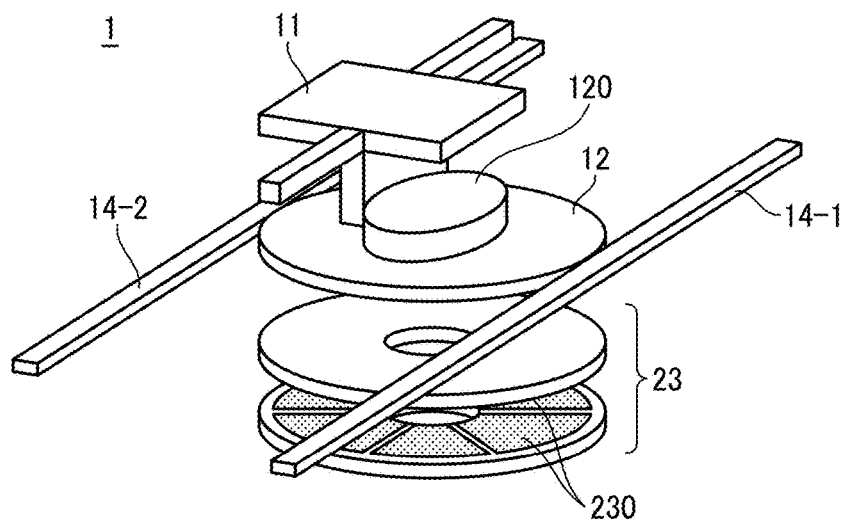
FIG. 5 is a perspective view of a configuration of a movable device according to a first modification of the first embodiment.

FIG. 5 is a perspective view of a configuration of a movable device 1 according to a first modification of the first embodiment. The movable device 1 of the first modification differs from the movable device 1 of the first embodiment in a unit for generating a vibration wave in the driving section. Electrodes 230 are provided as the drivers. In this configuration, the electrodes 230 are disposed so as to face the driving section. The electrodes 230 is driven by electrostatic attractive force in response to input of an electrical signal. The driving section 23 is at a position to be in contact with the mechanical section 12. For ease of description, the driving section 23 is illustrated at a position where the configuration thereof can be seen.

Second Modification of First Embodiment

In the first embodiment, the concave portion 160 and the convex portion 150 are described as one example. In some embodiments, the concave portion 160 and the convex portion 150 may have other shapes. The shape of the convex portion may be modified as appropriate from the viewpoint of ease of manufacturing the convex portion, prevention of chipping, or the like.

Since the driving direction can be selected in the driving method of the first embodiment, it is preferable to form a regular triangle or an isosceles triangle so that the same force can be applied in any driving direction. In order to prevent chipping of the peak portion, it is preferable to chamfer the peak portion.

FIGS. 6A, 6B, and 6C are illustrations of concave portions 160 and convex portions 150 according to the second modification. With driving of the mechanical section 12, the concave portions 160 move with relative to the convex portions 150 in directions of arrows as illustrated in FIGS. 6A, 6B, and 6C.

As illustrated in FIGS. 6A, 6B, and 6C, the concave portions 160 and the convex portions 150 may be configured to be engaged with each other. The shape of the convex portion may be an isosceles triangle, a right triangle, or the like, but may be any other shape as long as the shapes can be engaged with each other.

Triangular convex portions are illustrated in FIGS. 6A, 6B and 6C. Each of the concave portions 160 and the convex portions 150 has a triangular shape, and has a portion serving as a peak portion of the convex portion and a portion serving as a valley portion of the concave portion. The peak portions of the convex portions as illustrated in FIG. 6A may be appropriately chamfered. For example, as illustrated in FIG. 6B, the apexes of the peak portions and the valley portions may be rounded, or as illustrated in FIG. 6C, the apexes may be tapered.

FIGS. 7A, 7B, and 7C are illustrations of concave portions 160 and convex portions 150 according to the second modification. In the driving direction that is fixed in one direction, it is preferable to have a shape that facilitates driving in that driving direction and causes the mechanical section to less likely move in the reverse direction. As illustrated in FIGS. 7A, 7B, and 7C, each triangular convex portion has a steep tilt angle at the positive side thereof in the driving direction and a gentle tilt angle at the negative side thereof in the direction opposite to the driving direction.

Third Modification of First Embodiment

In the first embodiment, the contact portion 120 has an elliptical contour.

In the first embodiment, the rotation axis L1 of the mechanical section 12 is aligned with the central axis of the ellipse. The shape and arrangement of the contact portion 120 are not limited thereto. The contact portion 120 may have any shape as long as the tilt angle of the movable portion 11 is variable with the driving of the mechanical section 12. In some examples, the contact portion 120 may be disposed at a position offset from the central axis L1 of the mechanical section 12.

FIGS. 8A, 8B, 8C, and 8D are illustrations of a contact portion according to the third modification. As illustrated in FIG. 8A, the contact portion 120 may have an elliptical shape with its center coincident with the rotation axis L1. Alternatively, the contact portion 120 may have another modified shape.

For example, a contact portion 121 may have a shape as illustrated in FIG. 8B. Since the movable portion 11 contacts the contact portion 121 along the outline of the contact portion 121, the tilting movement of the movable portion 11 varies with the shape of the outline of the contact portion 121. Since the movement of the movable portion 11 contacting the contact portion 121 is described above with an example of an ellipse, further description will be omitted.

The contact portion 122 may be arranged as illustrated in FIG. 8C. The outer shape of the contact portion 122 is the same ellipse as the contact portion 120 in FIG. 8A. FIG. 8C differs from FIG. 8A in the arrangement of the contact portion 122 relative to the rotation axis L1. The arrangement in FIG. 8C changes the tilting speed and tilt angle of the movable portion 11.

FIG. 8D is an illustration of another example of the contact portion (i.e., a contact portion 123). The contact portion 123 is provided with a step portion in the outer shape. When the contact location between the movable portion 11 and the contact portion 123 reaches the step portion, the direction of the movable portion 11 is rapidly changed.

Second Embodiment

In the first embodiment, the mechanical section performs rotational motion or turning motion, and the mechanical section is driven in the rotation direction. In the second embodiment, the mechanical section performs a linear motion to be driven linearly. The linear motion is, for example, a reciprocating motion on a straight line. The linear motion may be a motion in only one direction.

Figure 9:
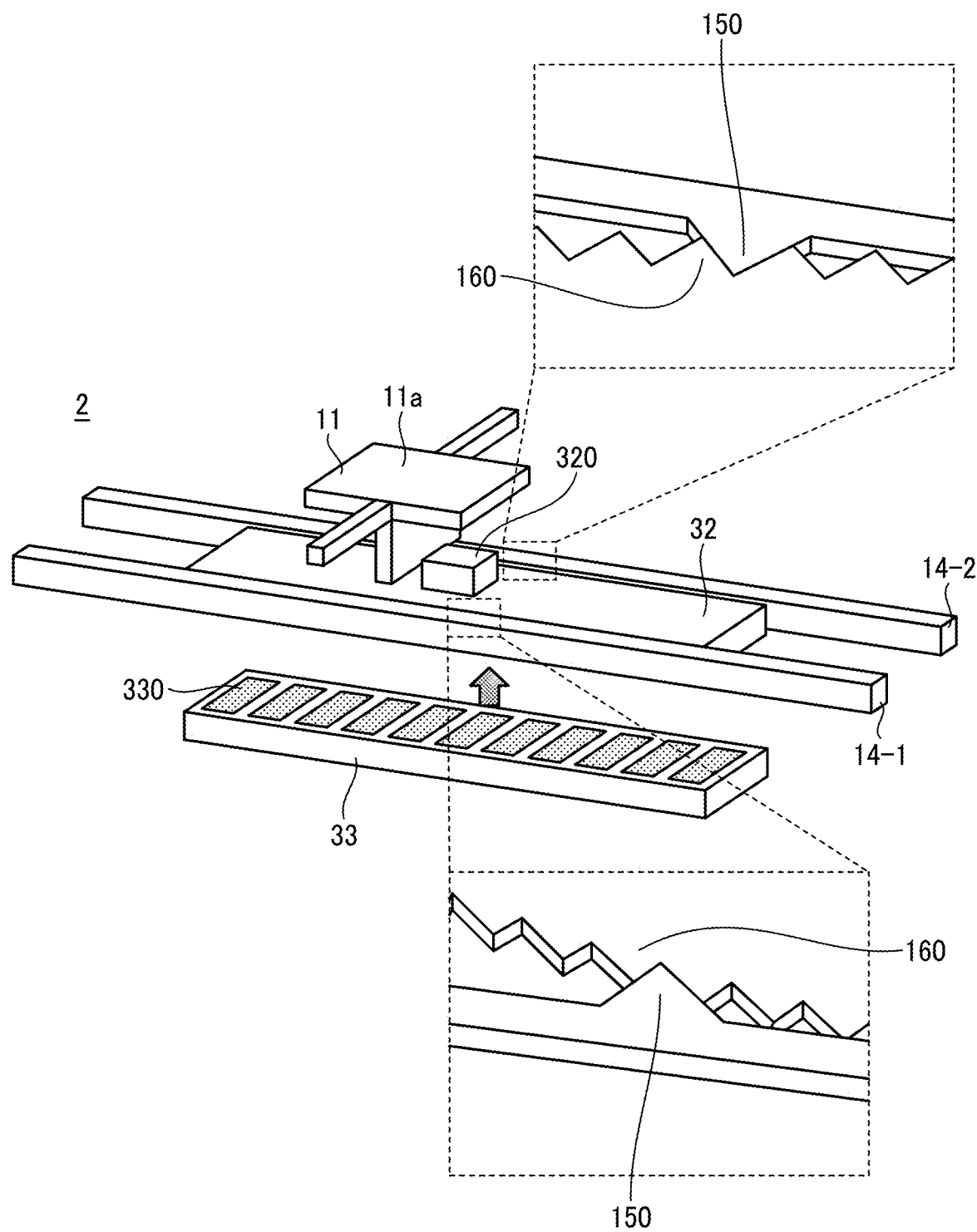
FIG. 9 is a perspective view of a configuration of a movable device according to a second embodiment.

FIG. 9 is a perspective view of a configuration of a movable device according to the second embodiment. The movable device 2 includes a movable portion 11, a mechanical section 32, and a driving section 33. The driving section 33 is at a position to be in contact with the mechanical section 32, which is indicated by arrow in FIG. 9. For ease of description, the driving section 33 is illustrated at a position where the configuration thereof can be seen.

The movable portion 11 has a reflecting portion 11a. The movable portion 11 is supported by a beam so as to oscillate to change the direction of the reflecting portion 11a.

The mechanical section 32 includes a contact portion 320 that comes into contact with the movable portion 11. The mechanical section 32 is movable in one direction (linear direction) while being guided by the support portion 14-1 and the support portion 14-2.

The mechanical section 32 is linearly driven by the force of the driving section 33. The movable portion 11 is driven by the driving section via the contact portion 320 to move in a direction in which the movable portion 11 is oscillatable or swingable.

The driving section 33 is a driving section for driving the mechanical section 32 in a linear direction. The driving section 33 itself is fixed so as not to move. The driving section 33 comes into contact with the mechanical section 32 in a pressurized state, and when an electric signal (driving signal) is input to the driving section 33, the driving section 33 gives a driving force in a linear direction to the mechanical section 32. When the driving force applied to the mechanical section 32 by the driving section 33 exceeds a certain force, the mechanical section 32 is driven in the linear direction.

Linearly driving the mechanical section 32 controls the angle of the movable portion 11. When the movable portion 11 is brought to a standstill while being tilted, the contact portion 320 receives a restoring force that acts to return the movable portion 11 to the original horizontal state. With this force, the mechanical section 12 is forced to move in the same direction as the rotation direction of the mechanical section 32 or in the opposite direction.

The movable device 2 according to the second embodiment also has an engaging mechanism that prevents or reduces the movement of the mechanical section 32 under a restoring force that acts to return the movable portion 11 to the original horizontal state.

FIG. 9 is an enlarged view of a part of the movable device 2, illustrating a convex portion 150 and concave portions 160 of the engaging mechanism. The mechanical section 32 has multiple concave portions 160 in the linear direction. The multiple concave portions 160 include a peak portion of the convex shape and a concave portion which is a valley portion between the convex shapes. In addition, each of the support portion 14-1 and the support portion 14-2 has a convex portion 150 at a position to be engaged with each concave portion 160. Each convex portion 150 has a peak portion of the convex shape. In a configuration including multiple convex portions 150, a valley portion exists between the convex portions. The convex portion 150 engages with a corresponding concave portion 160 of multiple concave portions 160 (i.e., a concave portion 160 at a position corresponding to the convex portion 150).

The support portion 14-1 and the support portion 14-2 are pressed by a spring structure so that the convex portion 150 engages with the concave portion 160 of the mechanical section 32 under a predetermined force. The linear driving of the mechanical section 32 moves the support portion 14-1 and the support portion 14-2 outward when the convex portion 150 passes by the peak of the concave portion 160 being engaged with the convex portion 150. This engaging mechanism prevents the concave portion 160 from passing by the peak portion of the convex portion 150 in response to the movement of the mechanical section 32 in the rotation direction under restoring force of the movable portion 11 returning to the original horizontal state. Thus, the driving force applied to the mechanical section 32 by the driving section 33 is reduced to a certain degree or less.

Method for Driving Movable Device

The driving section 33 in FIG. 9 includes piezoelectric elements 330 on a surface facing the mechanical section 32.

The piezoelectric elements 330 are provided to contract along the linear direction of the mechanical section 32. In this example (FIG. 9), multiple piezoelectric elements 330 having the same shape are provided along the linear direction. Similarly to the first embodiment, the mechanical section 32 is linearly driven in response to electrical signal input to the piezoelectric elements 330.

Figure 10A:
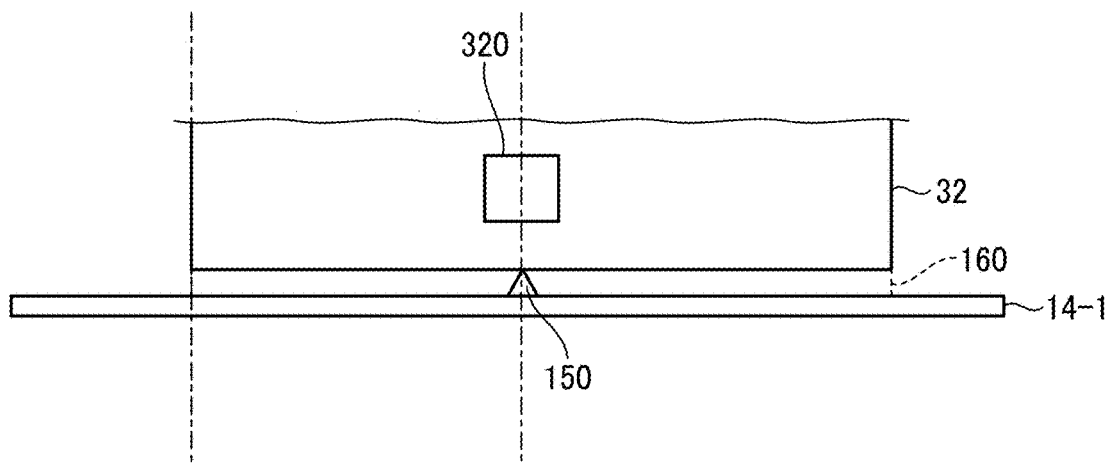
FIGS. 10A, 10B, and 10C are diagrams of the relation between concave portions of a mechanical section and a convex portion of a support portion during the driving of the mechanical section in the movable device in FIG. 9.
Figure 10B:
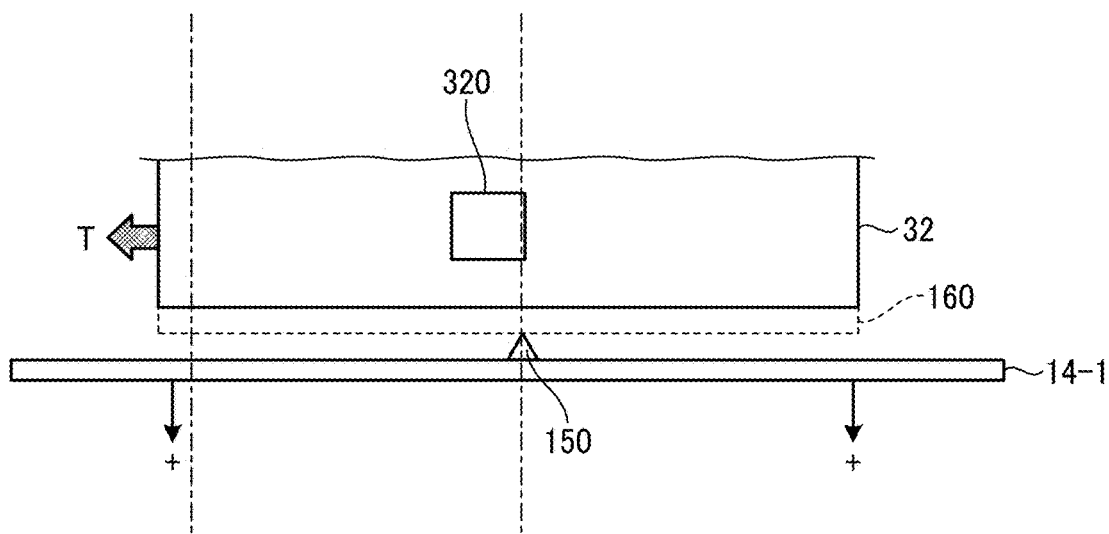
Figure 10C:
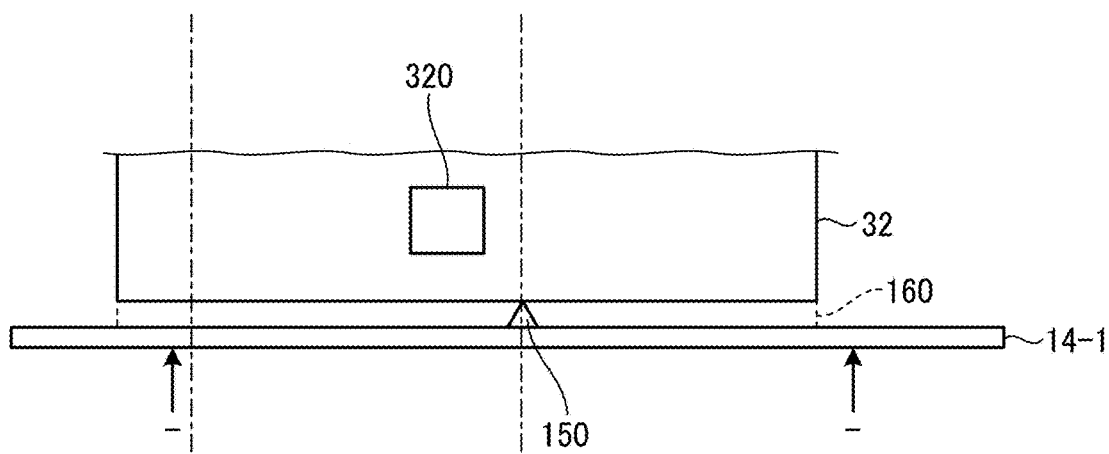

FIGS. 10A, 10B, and 10C are diagrams of the relation between the concave portions 160 of the mechanical section 32 and the convex portion 150 of the support portion 14-1 during the driving of the mechanical section 32. FIGS. 10A to 10C are plan views of the mechanical section 32 and the support portion 14-1 during the driving of the mechanical section 32.

The support portion 14-2 is disposed symmetrically with the support portion 14-1 in the vertical direction and is driven together in a direction opposite to the driving direction of the support portion 14-1 in the plan view of the mechanical section 32 as illustrated in FIGS. 10A, 10B, and 10C.

As illustrated in FIG. 10A, multiple concave portions 160 are disposed on the mechanical section 32 along the driving direction. The concave portions 160 are provided in a region having a length of a movable range in which the mechanical section 32 is movable. The support portion 14-2 also includes multiple concave portions 160 at corresponding locations.

Although only one convex portion 150 is provided on each of the support portion 14-1 and the support portion 14-2, the number of convex portions is not limited to one as described above and may be plural. When the number of engagement portions at each of which the concave portion 160 is engaged with the convex portion 150 is increased, multiple convex portions 150 may be provided in corresponding engagement area.

FIG. 10A is an illustration of the convex portion 150 engaged with the concave portion 160 of the concave portions 160. From the state in FIG. 3A, the mechanical section 32 is linearly driven. The driving force of the driving section 13 is used to cause the concave portion 160 to move beyond the convex portion 150.

As illustrated in FIG. 10B, with the mechanical section 32 driven in a linear direction T, in the process of passing by the peak portion of the concave portion 160, the convex portion 150 is pressed by the peak portion of the concave portion 160 so that the convex portion 150 is pushed out together with the support portion 14-1 in the direction of the arrow +. For the support portion 14-2 symmetrical to the support portion 14-1 in the vertical direction, the support portion 14-2 is pushed out in the opposite direction (−) of the arrow +.

In FIG. 10C, with the mechanical section 32 further driven in the linear direction T, upon passing by the peak portion of the concave portion 160 by the convex portion 150, the support portion 14-1 is pushed back by the spring mechanism and gradually returns in the direction of an arrow −. Then, the convex portion 150 engages with a valley portion of another concave portion 160 adjacent to the concave portion 160 out of which the convex portion 150 has moved. The support portion 14-2 gradually returns in the direction of the arrow + and engages with the valley portion of another concave portion 160 adjacent to the concave portion 160 out of which the convex portion 150 has moved out.

During the driving of the mechanical section 32, a cycle of the states illustrated in FIGS. 10A to 10C is repeated, and the convex portion 150 passes by the peak portion of the concave portion 160 one after another. With such a repeated action, the mechanical section 32 is driven to rotate in the linear direction T. Depending on how to input electrical signals to the driving section 33, the linear direction may be changed from the linear direction T to its opposite direction.

When the direction of the reflection portion 11a is desired to be fixed in a desired direction, the engaging mechanism allows the mechanical section 32 to remain stationary using a force greater than a force pushing back the contact portion 320, which is created by a restoring force that acts to return the movable portion 11 to the original horizontal state. Irrespective of receiving a force that acts to move the mechanical section 32 in the linear direction, the concave portion 160 fails to move beyond the peak of the convex portion 150. In this configuration, the mechanical section 32 can remain stationary with a reduction in the driving force for driving the mechanical section 32 by the driving section 33.

Although in the present embodiment, the piezoelectric elements generate the vibration wave in the driving section, means for generating the vibration wave in the driving section is not limited to the piezoelectric elements. As in the first embodiment, other means may be used. Since the traveling direction of the vibration wave can be changed by the electric signal input to the driving section, the movable portion is tilted greatly, and then returned to the original tilt. In addition, the shape of the convex portion of the engaging mechanism may be appropriately modified.

The description thereof, which is the same as that of the first embodiment, is omitted to avoid its repetition.

As described above, in the configuration of the second embodiment, the vibration wave of the driving section is configured to travel linearly. In this configuration, the mechanical section can be displaced as desired. This minimizes the area of the mechanical section and the driving section and allows a compact movable device.

Third Embodiment

In the first embodiment, the direction of the reflective portion of the movable portion that can oscillate is changed. However, in the third embodiment, the movable portion is not limited to such an oscillatable movable portion. In the third embodiment, other application examples will be described.

Figure 11A:
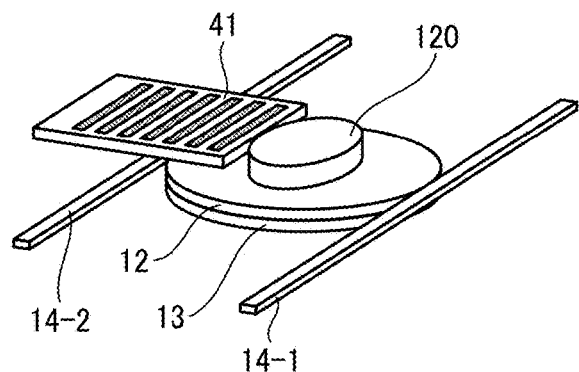
FIGS. 11A and 11B are perspective views of a configuration of a movable device according to a third embodiment.
Figure 11B:
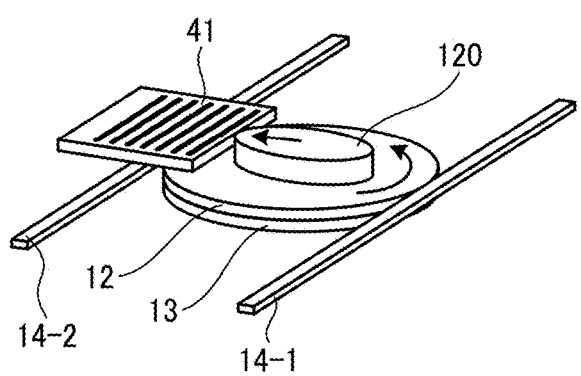

FIGS. 11A and 11B are perspective views of a configuration of a movable device 1 according to the third embodiment. In the movable device 1 illustrated in FIGS. 11A and 11B, the movable portion 11 is replaced with a movable portion 41 that is oscillatable in the movable device 1 of the first embodiment.

The movable portion 41 is a deformable elastic structure provided with a fine periodic structure. With a change in the contact location at which the movable portion 41 contacts the contour surface of the contact portion 120, the movable portion 41 is deformed by being pressed to be crushed by the contact portion 120 or returning to the original shape.

FIGS. 11A and 11B are illustrations of a stationary state of the movable portion 41. With an electrical signal continuously input to the driving section 13, the movable portion 41 changes its shape from a first state FIG. 11A to a second state in FIG. 11B. The movable portion 41 remains stationary as in FIG. 4B after the input of the electrical signal is stopped.

FIG. 11A is an illustration of the orientation of the movable portion 41 having its force balanced with the force of the contact portion 120 with no electrical signal input to the driving section 13. In response to driving the mechanical section 12 after an electrical signal is input to the driving section 13, the mechanical section 12 and the contact portion 120 rotate together in the rotation direction so that the direction of the contact portion 120 is changed as illustrated in FIG. 11B. Then, with a change in the contact location of the contact portion 120, a first end of the movable portion 41 is a fixed end, and a second end of the movable portion 41 is pressed by the contact portion 120 to deform the movable portion 41.

With the deformation of the movable portion 41, the period, or periodicity of the fine periodic structure changes. The fine periodic structure is, for example, a spectral filter or a wavelength selection filter, and when the period is changed, the spectrum of reflected light (or transmitted light) is changed. In this configuration, the mechanical section can remain stationary at a position to obtain desired spectrum with a reduction in the driving force for driving the mechanical section by the driving section.

Fourth Embodiment

In the second embodiment, the movable portion that is oscillatable is replaced with a deformable elastic structure.

Figure 12:
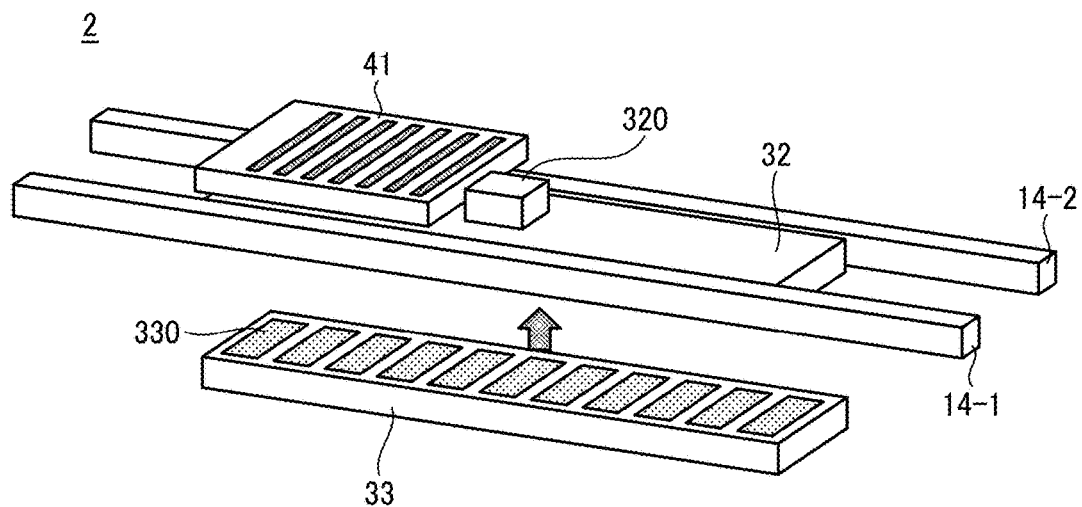
FIG. 12 is a perspective view of a configuration of a movable device according to a fourth embodiment.

FIG. 12 is a perspective view of a configuration of a movable device 2 according to the fourth embodiment. The movable device 2 in FIG. 12 includes a movable portion 41 instead of the movable portion 11 in the movable device 2 of the second embodiment. The movable portion 41 is a deformable elastic structure provided with a fine periodic structure.

Method for Driving Movable Device

Figure 13A:
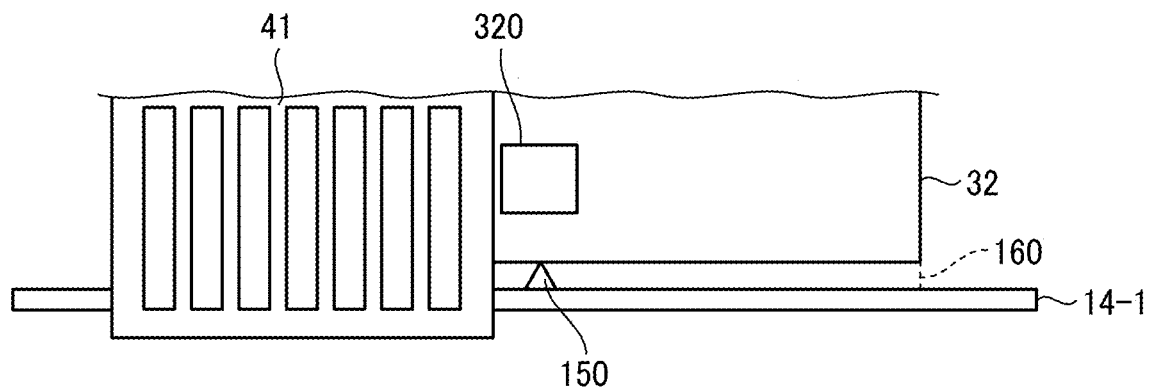
FIGS. 13A, 13B, and 13C are illustrations of deformation of a movable portion when a mechanical section is linearly driven.
Figure 13B:
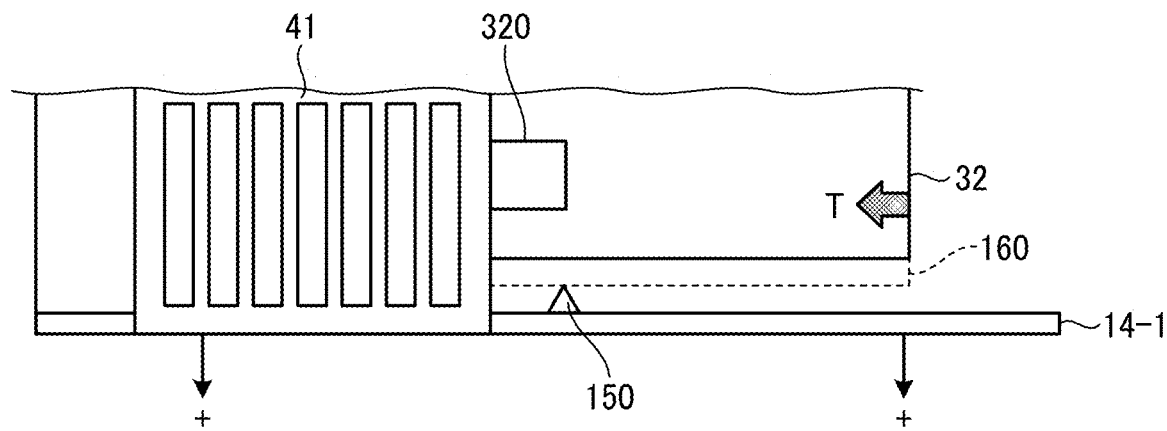
Figure 13C:
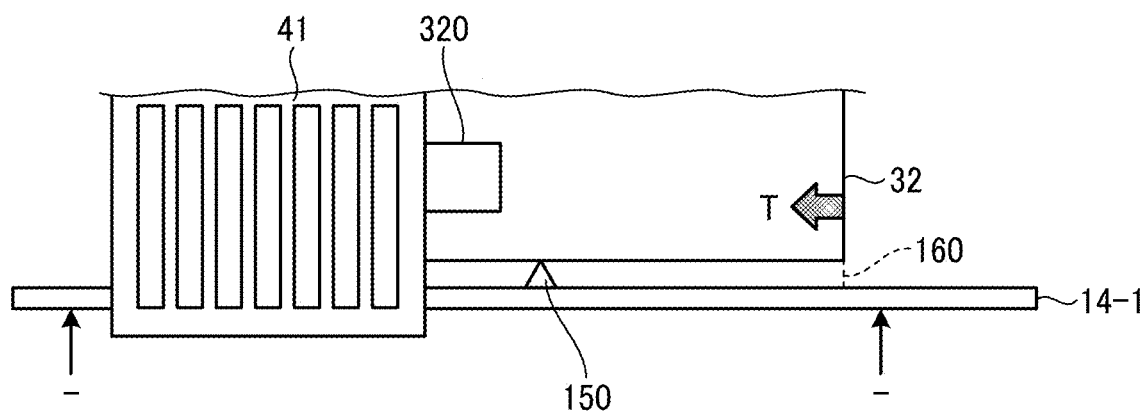

FIGS. 13A, 13B, and 13C are illustrations of deformation of the movable portion 41 when the mechanical section 32 is linearly driven. The description of the concave portion 160 of the mechanical section 32 and the convex portion 150 of the support portion 14-1 and the support portion 14-2, which are the same as that of the second embodiment (FIGS. 11A and 11B), is omitted.

FIG. 13A is an illustration of the convex portion 150 engaged with the concave portion 160 of the concave portions 160. From the state in FIG. 3A, the mechanical section 32 is linearly driven. As illustrated in FIG. 13B, with driving of the mechanical section in the linear direction T, the contact portion 320 pushes the movable portion 41 to deform the movable portion 41. This deformation shortens the interval of the periodic structure. As illustrated in FIG. 13C, with further driving of the mechanical section 32 in the linear direction T, the contact portion 320 further pushes the movable portion 41 to further deform the movable portion 41. This further shortens the interval of the periodic structure.

As described above, even when the movable device of the second embodiment is applied, the movable portion 41 is deformed and the period of the fine periodic structure is changed.

Fifth Embodiment

Although the movable device of the first and second embodiments has a configuration in which the reflection portion deflects light with oscillation of the movable portion, the fifth embodiment provides a movable device that scans light in a first scanning direction and a second scanning direction different from the first scanning direction, with the oscillation of the movable portion.

Figure 15:
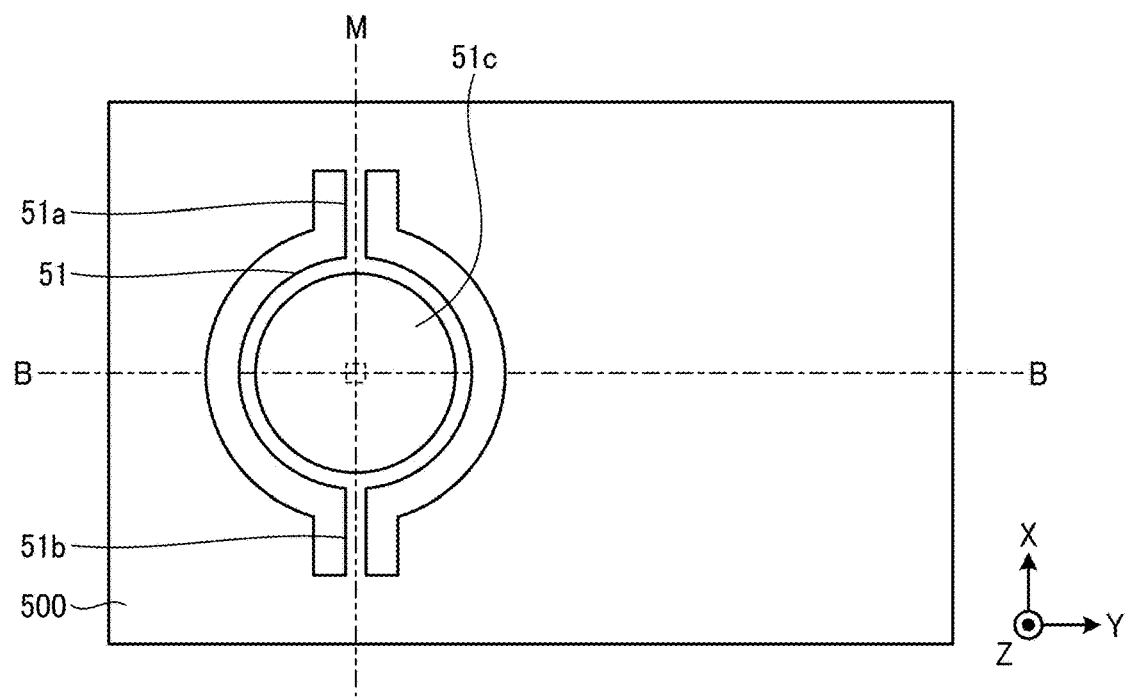
FIG. 15 is an illustration of the movable portion.
Figure 16:
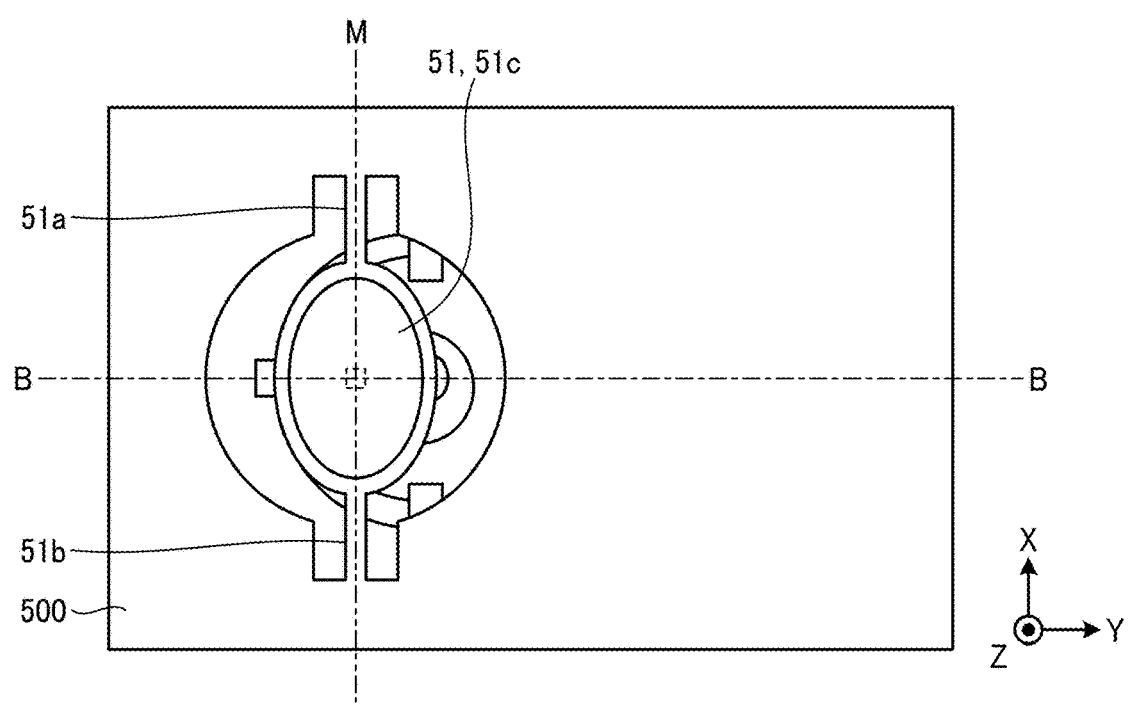
FIG. 16 is another illustration of the movable portion.

FIGS. 14A, 14B, and 14C are perspective views of a configuration of a movable device 3 according to the fifth embodiment. FIGS. 15 and 16 are illustrations of the movable portion.

FIG. 14A is an illustration of the entire configuration of the movable device 3. The movable device of the present embodiment incorporating a second mechanical section, which corresponds to a second movement mechanical section (or another driving section), enables optical scanning in a second direction.

The movable device 3 of the present embodiment includes a mechanical section 12 that is driven to rotate in a rotational direction by a driving section 13; and a movable portion 11 that is movable by a linear movement mechanical section. The mechanical section 12 that mainly drives in the rotation direction corresponds to the second mechanical section. The following describes differences from the movable device of the first and second embodiments.

The mechanical section 12 is not provided with the engaging mechanism. In this configuration, if the movable portion 51 stands still while being tilted, the restoring force that acts to return the movable portion 51 to the horizontal state is applied only to the linear movement mechanical section, and no force acts in the rotation direction of the mechanical section 12. This configuration eliminates the use of the engaging mechanism.

The mechanical section 12 is a lower part of a tubular portion having a circular plate 500 on its top. The tubular portion has a cylindrical shape. In response to driving the mechanical section 12 in the rotation direction, the tubular portion is driven in the rotation direction integrally with the mechanical section 12. The mechanical section 12 has a linear movement mechanical section on the center line of the rotating surface of the mechanical section 12. The linear movement mechanical section is also driven in the rotational direction integrally with the mechanical section 12, in response to driving the mechanical section 12 in the rotation direction.

The linear movement mechanical section includes a driving section 33, a mechanical section 32, and a contact portion 320. The relative position between the contact portion 320 and the movable portion 51 is the same as the relative position between the contact portion 320 and the movable portion 11 (see FIG. 9). With the linear driving of the mechanical section 32, the contact portion 320 tilts the orientation of the movable portion 51 within the first direction. When the movable portion 51 stands still while being tilted, the restoring force that acts to return the movable portion 51 to the horizontal state is applied to the contact portion 320 of the linear movement mechanical section. This entails the need to use the engaging mechanism for the mechanical section 32 and the support portion 14-1 and for the mechanical section 32 and the support portion 14-2. The description of the engaging mechanism is omitted because the engaging mechanism has the same configuration as those in FIGS. 9, 10A, 10B, and 10C.

The movable portion 51 is disposed at the +Z-side of the mechanical section 32. The movable portion 51 is connected to one end of each of torsion bars 51a and 51b which are torsion beams provided so as to sandwich the movable portion 51 along the X-direction. The torsion bars 51a and 51b each include a silicon active layer to have elasticity.

The other end of each of the torsion bars 51a and 52b is connected to a support frame of the circular plate 500. The torsion bars 51a and 51b support the movable portion 51 to allow the movable portion 51 to oscillate about the oscillation-axis M parallel with the X-direction. The center of the reflection surface 51c of the movable portion 51 is at the intersection of the oscillation-axis M and the line segment B.

As the contact portion 320 reciprocates in the Y-direction, the movable portion 51 continuously changes its tilt around the oscillation-axis M.

The oscillation of the movable portion 51 as illustrated in FIG. 16 changes the reflection direction of, for example, the laser beam striking the reflection surface 51c within the first direction.

Driving the mechanical section 12 in the rotation direction drives the circular plate 500 to rotate in the rotation direction. With combination of the driving in the rotation direction and the tilting of the direction of the movable portion 51 within the first direction, the direction of the movable portion 51 is changed in any direction.

As described above, linearly driving the mechanical section 32 from the initial state as illustrated in FIG. 14B to the state as illustrated in FIG. 14C allows the contact portion 320 to tilt the movable portion 51 in the first direction indicated by the arrow around the movable portion 51. Driving the mechanical section 12 in the rotation direction indicated by the arrow around the mechanical section 12 drives the circular plate 500 in the rotation direction. This tilts the movable portion 51 in any desired direction.

Sixth Embodiment

Figure 17:
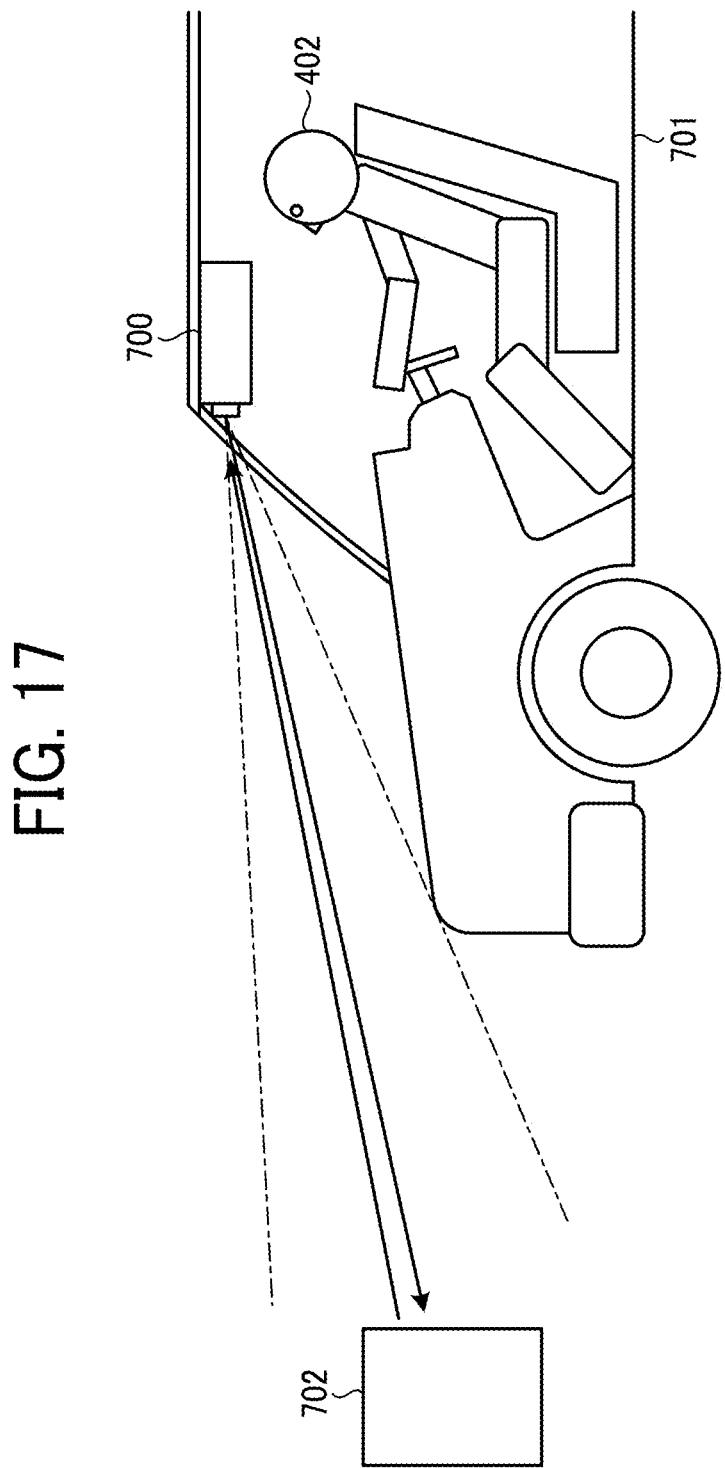
FIG. 17 is a diagram of a range-finding apparatus incorporating the movable device according to an embodiment of the present disclosure.
Figure 18:
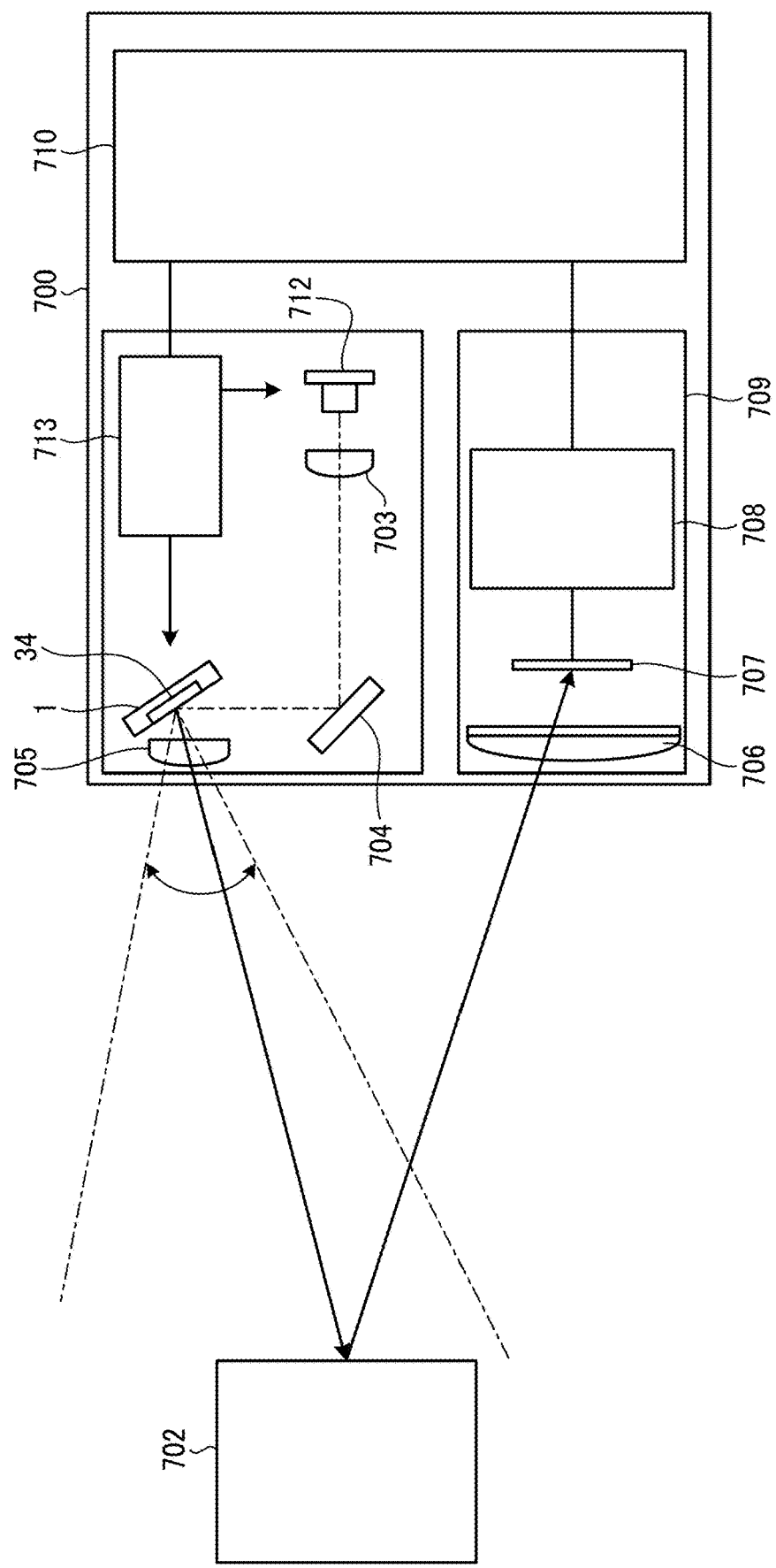
FIG. 18 is an illustration of a LiDAR device according to an embodiment mounted on the vehicle.

FIG. 17 is a diagram of a range-finding apparatus incorporating the movable device according to an embodiment of the present disclosure. FIG. 17 is an illustration of a vehicle 701 mounted with a laser imaging detection and ranging (LiDAR) device 700, according to an embodiment of the present disclosure. As an example, FIG. 17 also indicates the riding state of the driver 402. FIG. 18 is an illustration of a LiDAR device 700 according to an embodiment. The LiDAR device 700 is an example of a range-finding apparatus including a movable device according to an embodiment of the present disclosure.

As illustrated in FIG. 17, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

As illustrated in FIG. 18, the laser beams emitted from a light-source device 712 pass through an incident optical system, and then are caused to perform scanning uniaxially or biaxially using a scanning mirror 704 including the reflecting surface. The incidence optical system includes a collimator lens 703 that serves as an optical system that collimates divergent beams into approximately parallel beams, and the scanning mirror 704. The parallel beams are emitted to the object 702 ahead of the device, as passing through, for example, a projection lens 705 that serves as a projection optical system. The driving of the light-source device 712 and the movable device 1 is controlled by the control device 713 that controls the scanning mirror 704. The movable device 1 switches the direction (the deflection direction) in which the light for forming an image has been deflected by the scanning mirror 704, at m stages in the X-direction (i.e., the predetermined direction). Herein, m is an integer of one or greater.

The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 712 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The reflecting surface 34 is switchable in m steps along one or both of the X-direction and the Y-direction orthogonal to the X-direction. The movable device 1 including such a reflecting surface 34 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or to recognize the distance to the obstacle.

Such a configuration in which the movable device according to an embodiment is incorporated in a range-finding apparatus provides a range-finding apparatus that reduces the power consumption of the movable device 1 and brings the movable portion to standstill at a predetermined angle.

Seventh Embodiment

Figure 19:
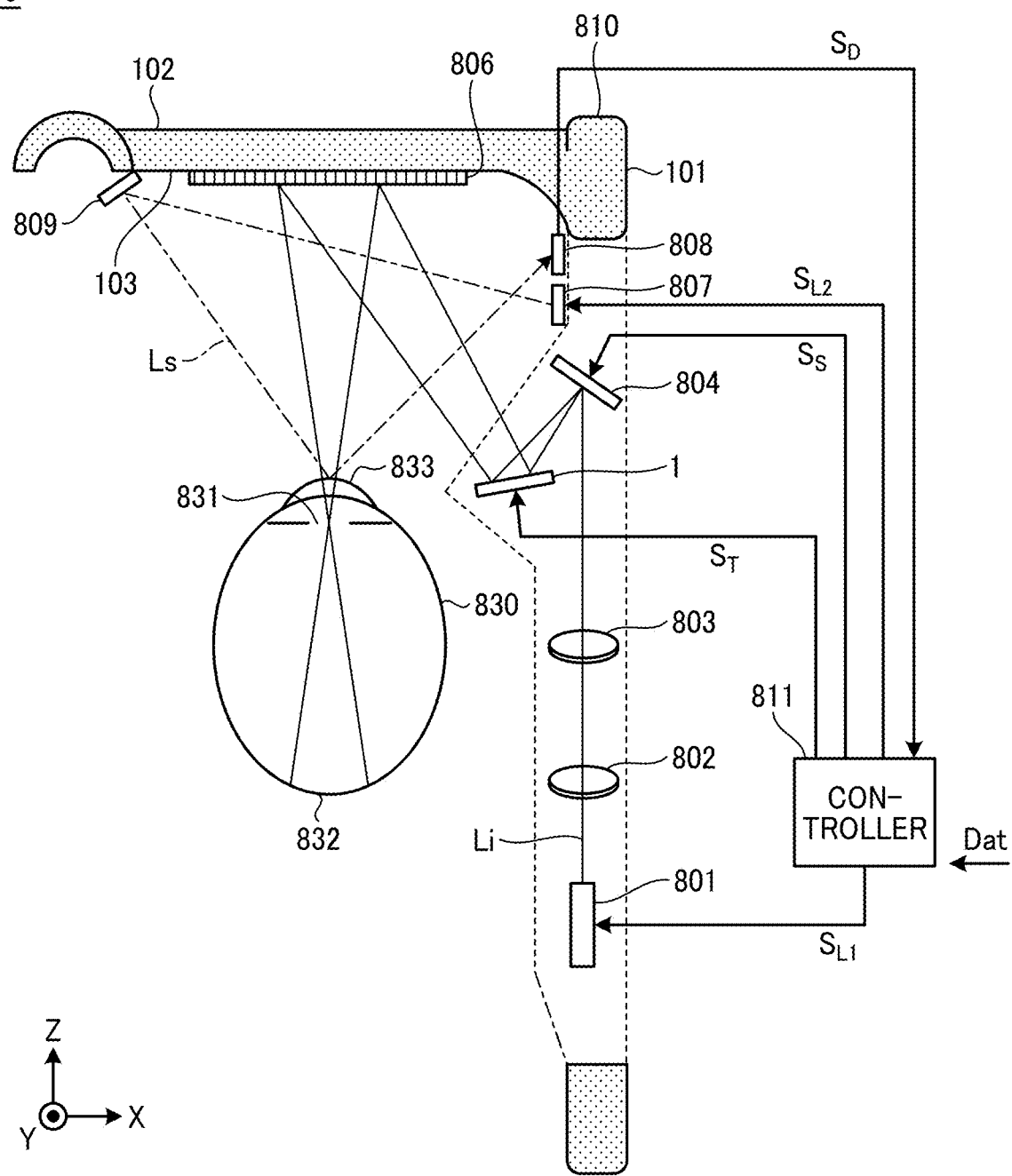
FIG. 19 is an illustration of the configuration of a retinal projection display device according to an embodiment.

FIG. 19 is an illustration of the configuration of a retinal projection display device 800 according to an embodiment. A retinal projection display device 800 according to an embodiment is a wearable terminal (i.e., wearable device) and is a head mounted display (HMD) that forms or draws an image directly on the retina of a user by laser scanning according to the Maxwellian view. The retinal projection display device 800 is an example of an image display apparatus.

As illustrated in FIG. 19, the retinal projection display device 800 includes a laser light source 801 (a laser beam emitted from which is used for forming an image), a lens 802, a lens 803, a scanning mirror 804, a movable device 1, a projection optical element 806, a laser light source 807 (a laser beam emitted from which is used for detection), a photosensor 808, and a reflector 809. The retinal projection display device 800 includes an eyeglass frame 810 and a controller 811.

The eyeglass frame 810 includes a temple 101 and a rim 102, and an eyeglass lens 103 held by the rim 102. The laser light source 801, the lens 802, the lens 803, the scanning mirror 804, the movable device 1, and the controller 811 are provided inside the temple 101. The projection optical element 806 is provided on the surface of the eyeglass lens 103 held by the rim 102. The user wears the retinal projection display device 800 on their head by putting the eyeglass frame 810 on their ears.

The laser light source 801 is a semiconductor laser that emits a laser beam Li for forming an image, having a single wavelength or multiple wavelengths. When a monochrome image is displayed, a laser light source that emits the laser beam Li having a single wavelength is used as the laser light source 801. When a color image is displayed, multiple laser light sources that emit laser beams having multiple wavelengths such as a red semiconductor laser, a green semiconductor laser, and a blue semiconductor laser, are used as the laser light source 801. The laser light source 801 emits a laser beam Li in response to a formation drive signal $S_{L1}$ from the controller 811.

The scanning mirror 804 is a mirror that oscillates about two axes substantially orthogonal to each other and perform scanning with the laser beam Li emitted from the laser light source 801. The scanning mirror 804 performs scanning with the laser light beam Li incident on the scanning mirror 804 by oscillating to change the angle of the scanning mirror 804, so as to form an image displayed in one field of view on the retina 832 of the eyeball 830.

The scanning mirror 804 deflects the laser beam Li incident thereon, in the X-direction and the Y-direction. The X-direction in FIG. 19 is a main scanning direction in which pixels are drawn continuously in terms of time to form a series of pixel groups. The Y-direction is perpendicular to the main scanning direction and refers to a sub-scanning direction in which a series of pixel groups are arranged. Scanning speed in the main scanning direction is set higher than scanning speed in the sub-scanning direction. An image is formed with the laser beam Li deflected for scanning.

The movable device 1 is disposed between the scanning mirror 804 and the projection optical element 806. The movable device 1 deflects the laser beam Li by changing its tilt.

The movable device 1 deflects the scanning laser beam Li so as to irradiate the retina 832 with the laser beam Li. The movable device 1 switches the deflection direction discretely and selectively. The movable device 1 oscillates around an axis in the Y-direction and is stopped and fixed at the tilt of any one of m stages under the control of a deflection drive signal $S_T$, in which m is an integer of 1 or more.

The deflected light for forming an image is emitted toward the projection optical element 806. The movable device 1 switches the direction (the deflection direction) in which the light for forming an image has been deflected by the scanning mirror 804, at m stages in the X-direction. Herein, m is an integer of one or greater. In the present embodiment, the deflection direction of the light for forming an image is switched in three stages (i.e., m=3). However, this is only one example, and m is appropriately selected.

The projection optical element 806 is disposed between the scanning mirror 804 and the retina 832. The projection optical element 806 includes a holographic optical element that reflects and focuses the laser beam Li emitted from the movable device 1 toward the eyeball 830 of the user.

The projection optical element 806 includes x hologram regions having different focusing properties where x is an integer of two or greater, obtained by multiplying n by m (i.e., x=m×n). The x hologram regions are optically recorded. Herein, n and m are integers of one or greater. Thus, for example, when n is one (n=1), m is two (m=2), and when m is one (m=1), n is two (n=2).

Each hologram region focuses the laser beam Li on different nine viewing zones in the vicinity of the pupil 831 of the eyeball 830. The nine viewing zones are positioned such that the laser beam Li is included in the pupil 831 of the user's eye when the user views along the nine sight lines.

The configuration including the laser light source 807 and the photosensor 808 detects the direction of the line of sight of the user wearing the retinal projection display device 800. The laser light source 807 emits a laser beam $L_S$ for detection to the eyeball 830. The photosensor 808 receives the laser beam $L_S$ reflected by eyeball 830 after emitted to the eyeball 830 and outputs a detection signal $S_D$ according to the intensity of the received light to the controller 811.

The controller 811 estimates the direction of the sight line of the user based on the detection signal $S_D$ and obtains information indicating the direction of the sight line (i.e., information of the sight line). In addition, the controller 811 controls a position at which an image is projected on the retina 832 according to the information on the sight line.

The detection signal $S_D$ is projection position information or image formation object position information for providing a projection position to the controller 811. The photosensor 808 outputs the projection position information or image formation object position information to the controller 811. However, the configuration of the line-of-vision direction detector is not limited to the configuration including the laser light source 807 and the photosensor 808. Any eye tracking technology may be applied to the configuration of the line-of-vision direction detector.

The laser light source 807 is a light source array such as a vertical cavity surface emitting laser (VCSEL) or a laser diode array (LDA) that emits the laser beam $L_S$ for detection toward the cornea 833 of the eyeball 830.

The laser light source 807 includes nine light emitters corresponding to nine fields of view for the nine viewing zones. The laser beam $L_S$ emitted from the laser light source 807 preferably has the wavelengths of near-infrared light, which is non-visible light, so as to prevent the visual recognition of the user whose line-of-vision direction is detected, from being hampered. However, the wavelength of the detection laser beam $L_S$ is not limited to the wavelengths of near-infrared light, and visible light may be used.

The photosensor 808 includes at least one photodiode that receives the laser beam $L_S$ reflected by the eyeball 830 after being emitted from x light emitters of the laser light source 807 (x is an integer of 1 or greater) to the eyeball 830 via the reflector 809.

The controller 811 inputs image data Dat which is a source of an image to be formed, and controls emission of the laser beam Li from the laser light source 801 based on the image data Dat.

In addition, nine light emitters (i.e., x=9) of the laser light source 807 are sequentially turned on in response to the drive signals $S_{L2}$ to control the emission of the laser beam $L_S$. In addition, based on the light emission timing of each light emitter of the laser light source 807 and the detection signal $S_D$ from the photosensor 808, the line-of-vision direction is estimated, which refers to which field of vision the line-of-vision is directed to among predetermined nine fields of view (i.e., x=9). The controller 811 controls the scanning of the scanning mirror 804 with the laser beam Li, by outputting the scanning drive signal $S_S$ to the scanning mirror 804. Further, the controller 811 controls the tilt of the movable device 1 by outputting the deflection drive signal $S_T$ to the movable device 1.

Figure 20A:
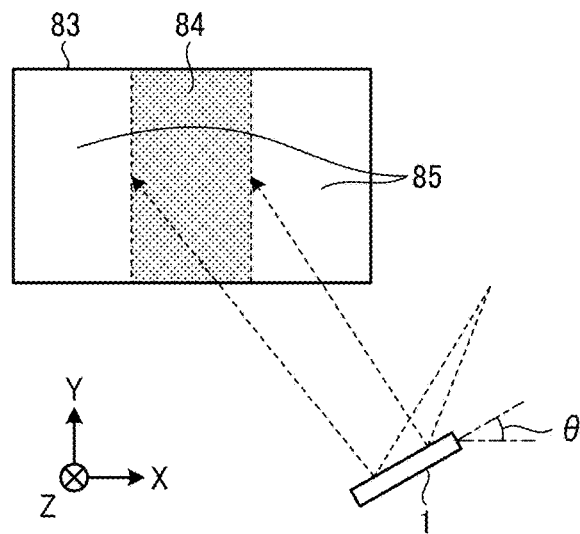
FIGS. 20A, 20B, and 20C are diagrams of a stationary state of the movable device in the retinal projection display apparatus.
Figure 20B:
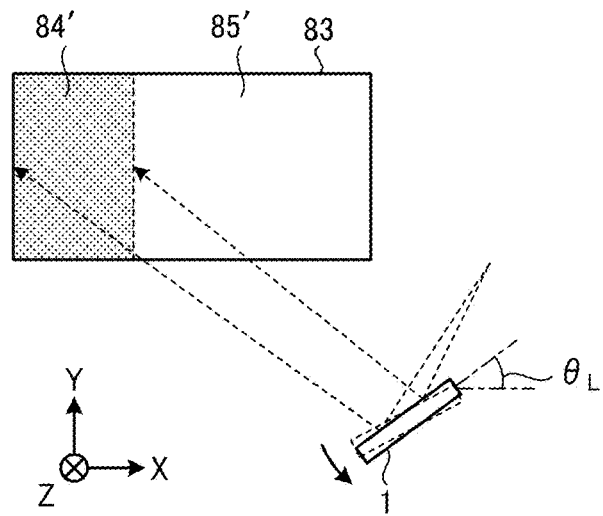
Figure 20C:
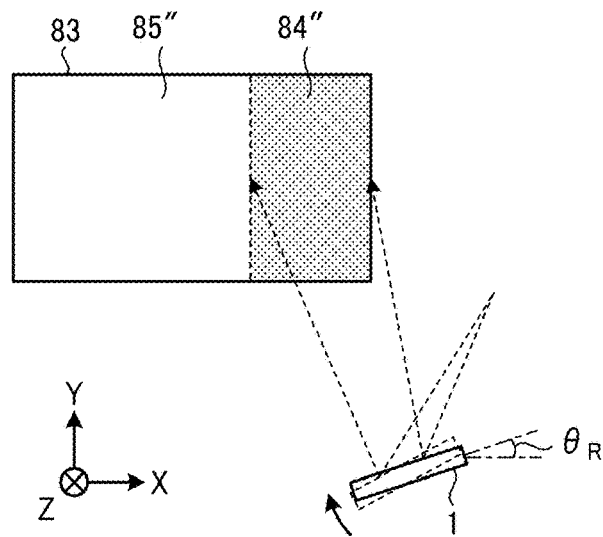

FIGS. 20A, 20B, and 20C are illustrations of a movable device 1 that remains stationary in the retinal projection display device 800.

FIG. 20A is an illustration of a first example of the movable device 1 with the movable portion maintained stationary at an angle θ to allow an image to be projected onto a projection region 84 at the central portion of the surface 83 to be scanned, in the X-direction. In order to clearly indicate the projection region 84, the projection region 84 is shaded, and the other region 85 is indicated in white.

FIG. 20B is an illustration of a second example of the movable device 1 with the movable portion maintained stationary at an angle θL to allow an image to be projected onto a projection region 84' at the −X-side portion of the surface 83. In order to clearly indicate the projection region 84', the projection region 84' is shaded and the other region 85' is indicated in white.

FIG. 20C is an illustration of a third example of the movable device 1 with the movable portion maintained stationary at an angle $θ_R$ to allow an image to be projected onto a projection region 84" at the +X-side portion of the surface 83 in the X-direction. In order to clearly indicate the projection region 84", the projection region 84" is shaded and the other region 85" is indicated in white.

In this manner, the movable device 1 can change the position of the projection region of the image in three stages along the X-direction by deflecting the scanned image laser beam Li. Incorporating the movable device 1 into the retinal projection display device 800 reduces the power consumption of the retinal projection display device 800 and brings the movable portion to standstill at any desired angle. Such a configuration further prevents or reduces a change in the position of the projection region of the image.

Eighth Embodiment

Figure 21:
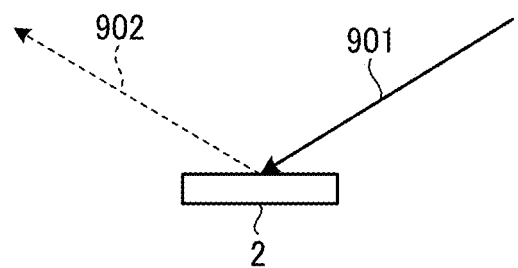
FIG. 21 is a diagram of a basic configuration of a wavelength-variable laser unit.

FIG. 21 is a diagram of a basic configuration of a wavelength-variable laser unit (or wavelength-variable laser). As illustrated in FIG. 21, the wavelength-variable laser unit includes a movable device 2 having a fine periodic structure. The fine periodic structure of the movable device 2 is irradiated with a laser beam 901 having a predetermined wavelength to vary the wavelength. The wavelength of the light 902 to be extracted is adjusted by changing the period of the fine periodic structure by driving the movable portion of the movable device 2. This basic configuration is applicable to all devices that varies the wavelength.

Ninth Embodiment

Figure 22:
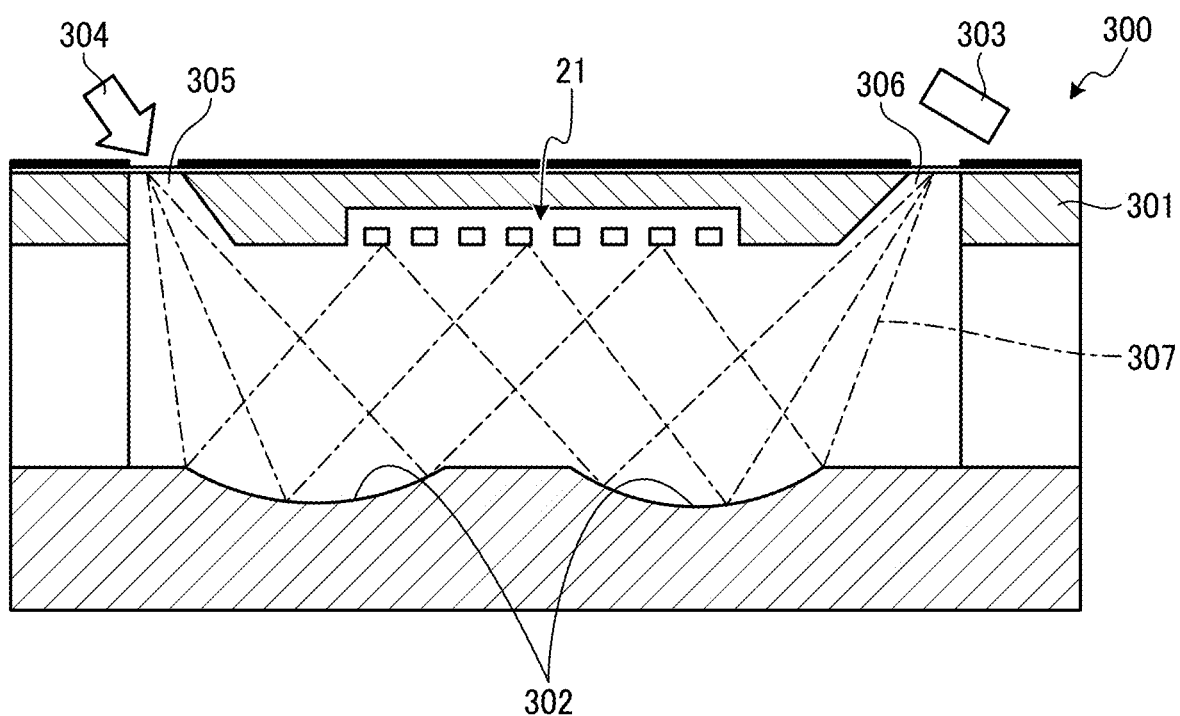
FIG. 22 is a diagram of a spectroscopic sensor.

FIG. 22 is a schematic diagram of a spectroscopic sensor. The spectroscopic sensor 300 includes a substrate 301 to which movable diffraction gratings 21 each having the fine periodic structure of the movable device 2 is attached, concave mirrors 302 facing the movable diffraction gratings 21 that correspond to the movable portion 41 in FIGS. 11A, 11B, and FIG. 12, and a detector 303. On the substrate 301, a slit 305 that accepts incident light 304 therethrough and guides the accepted incident light 304 to the concave mirror 302, and a slit 306 that lets diffracted light 307 pass therethrough and guides the diffracted light 307 to the detector 303 are formed.

In the spectroscopic sensor 300 of such a configuration as above, the incident light 304 having certain spectrum characteristics is incident on the movable diffraction gratings 21, and the diffracted light 307 excluding the zero-order diffracted light is received by the detector 303. By receiving the diffracted light 307 by the detector 303 while displacing the movable diffraction gratings 21, the spectrum information of the incident light 304 can be calculated from the relation between the amount of displacement of the movable diffraction gratings and the light amount of the diffracted light 307. This allows the optical spectrum to be obtained by the single pixel sensor and enables a reduction in size and cost as compared with the conventional spectral sensor using the sensor array.

Although preferred embodiments and the like have been described in detail above, the present disclosure is not limited to the above-described embodiments and the like. Although in the above-described embodiments, the movable portion includes a reflector or a fine periodic structure, the movable portion may include a photodiode, a heater (e.g., a heater using silicon mononitride (SiN), or a light source (e.g., a surface-emitting laser).

The description of the above embodiments is given by way of example, and no limitation is intended thereby. Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. These embodiments and examples are included in the scope and gist of the invention, and are included in the invention described in the claims and the scope equivalent thereto.

An embodiment of the present invention is as follows, for example.

Aspect 1

A movable device includes: a movable portion; a driving section configured to generate a driving force to move the movable portion; a movement mechanical section; and at least one convex portion. The movement mechanical section includes: a contact portion contacting the movable portion, the contact portion movable in a movement direction by the driving force of the driving section; and multiple concave-convex portions movable with the contact portion in the movement direction. At least one convex portion engages with corresponding one of the multiple concave-convex portions, said at least one convex portion being static relative to the movement mechanical section in the movement direction.

Aspect 2

A movable device includes: a movable portion; a driving section configured to generate a driving force to move the movable portion; a movement mechanical section; and at least one concave portion. The movement mechanical section includes: a contact portion contacting the movable portion, the contact portion movable in a movement direction by the driving force of the driving section; and multiple concave-convex portions movable with the contact portion. At least one concave portion engages with corresponding one of the multiple concave-convex portions, said at least one convex portion being static relative to the movement mechanical section in the movement direction.

Aspect 3

In the movable device according to Aspect 1 or 2, the corresponding one of the multiple concave-convex portions changes according to a movement of the multiple concave-convex portions.

Aspect 4

In the movable device according to any one of Aspect 1 to Aspect 3, the movable portion applies a restoring force to the movement mechanical section through the contact portion, and the driving force for changing the corresponding one of the multiple concave-convex portions is greater than the restoring force.

Aspect 5

In the movable device according to any one of Aspect 1 to Aspect 4, the contact portion is configured to move the movable portion in a predetermined direction in response to a movement of the multiple concave-convex portions.

Aspect 6

In the movable device according to any one of Aspect 1 to Aspect 5, the driving section includes multiple drivers on a surface facing the movement mechanical section.

Aspect 7

In the movable device according to any one of Aspect 1 to Aspect 6, said at least one convex portion holds the movement mechanical section and the movable portion at predetermined position when voltage or current applied to the driving section becomes a predetermined value or lower.

Aspect 8

In the movable device according to any one of Aspect 1 to Aspect 7, the contact portion moves in a rotation direction, a turning direction, or a linear direction.

Aspect 9

In the movable device according to any one of Aspect 1 to Aspect 8, the movable portion is swingable about an axis according to a movement of the contact portion in the movement direction.

Aspect 10

The movable device according to Aspect 8, further includes a reflector.

Aspect 11

In the movable device according to any one of Aspect 1 to Aspect 8, the movable device includes a deformable elastic structure including a periodic structure in which an optical filter is periodically formed on the deformable elastic structure.

Aspect 12

In the movable device according to Aspect 11, the movable portion has: one end fixed; and another end displaceable and pressed by the contact portion to change a period of the optical filter in the periodic structure.

Aspect 13

The movable device according to any one of Aspect 1 to Aspect 12, further includes: another driving section configured to generate a driving force to move the driving section, the movable portion, and the movement mechanical section in a scanning direction. The movable portion includes a reflector configured to deflect light in the scanning direction.

Aspect 14

A range-finding apparatus includes the movable device according to Aspect 10.

Aspect 15

An image display apparatus includes the movable device according to Aspect 10.

Aspect 16

A head-mounted display includes the movable device according to Aspect 10.

Aspect 17

A wavelength-variable laser includes the movable device according to Aspect 11.

Aspect 18

A spectroscopic sensor includes the movable device according to Aspect 11.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses.

The invention claimed is:

1. A movable device comprising:
a movable portion, and a torsion bar that supports the movable portion;
a driving section configured to generate a driving force to move the movable portion;
a movement mechanical section including:
a contact portion contacting the movable portion, the contact portion movable in a movement direction by the driving force of the driving section, wherein the contact portion moves in response to a drive of the driving section and tilts the movable portion about a rotation axis; and
multiple concave-convex portions movable with the contact portion in the movement direction,
at least one convex portion engaging with corresponding one of the multiple concave-convex portions, said at least one convex portion being static relative to the movement mechanical section in the movement direction,
wherein a torsional stiffness of the torsion bar about the rotation axis is smaller than a stiffness of the at least one convex portion in a direction in which the at least one convex portion faces the multiple concave-convex portions.

2. The movable device according to claim 1,
wherein the corresponding one of the multiple concave-convex portions changes according to a movement of the multiple concave-convex portions.

3. The movable device according to claim 1,
wherein the driving section includes multiple piezoelectric elements on a surface facing the movement mechanical section.

4. The movable device according to claim 1,
wherein the contact portion moves in one rotational direction, a bidirectional rotational direction, or a linear direction.

5. The movable device according to claim 1, further comprising:
another driving section configured to generate a driving force to move the driving section, the movable portion, and the movement mechanical section in a scanning direction,
wherein the movable portion includes a reflector configured to deflect light in the scanning direction.

6. The movable device according to claim 1, further comprising a reflector.

7. A range-finding apparatus comprising:
the movable device according to claim 6.

8. An image display apparatus comprising:
the movable device according to claim 6.

9. A head-mounted display comprising:
the movable device according to claim 6.

10. A movable device comprising:
a movable portion, and a torsion bar that supports the movable portion;
a driving section configured to generate a driving force to move the movable portion;
a movement mechanical section including:
a contact portion contacting the movable portion, the contact portion movable in a movement direction by the driving force of the driving section, wherein the contact portion moves in response to a drive of the driving section and tilts the movable portion about a rotation axis; and
multiple concave-convex portions movable with the contact portion,
at least one concave portion engaging with corresponding one of the multiple concave-convex portions, at least one convex portion being static relative to the movement mechanical section in the movement direction,
wherein a torsional stiffness of the torsion bar about the rotation axis is smaller than a stiffness of the at least one convex portion in a direction in which the at least one convex portion faces the multiple concave-convex portions.

* * * * *